(12) United States Patent
Kyogane et al.

(10) Patent No.: US 9,984,596 B2
(45) Date of Patent: May 29, 2018

(54) CYLINDRICAL SHRINK LABEL AND METHOD FOR PRODUCING SAME

(71) Applicant: FUJI SEAL INTERNATIONAL, INC., Osaka-shi, Osaka (JP)

(72) Inventors: Takeshi Kyogane, Osaka (JP); Satoru Kawasaki, Osaka (JP); Akira Miyazaki, Osaka (JP); Shutaro Kurosawa, Osaka (JP)

(73) Assignee: Fuji Seal International, Inc., Osaka-Shi, Osaka (JP)

( * ) Notice: Subject to any disclaimer, the term of this patent is extended or adjusted under 35 U.S.C. 154(b) by 356 days.

(21) Appl. No.: 14/425,216

(22) PCT Filed: Aug. 30, 2013

(86) PCT No.: PCT/JP2013/073380
§ 371 (c)(1),
(2) Date: Mar. 2, 2015

(87) PCT Pub. No.: WO2014/034881
PCT Pub. Date: Mar. 6, 2014

(65) Prior Publication Data
US 2015/0262514 A1    Sep. 17, 2015

(30) Foreign Application Priority Data

Aug. 31, 2012  (JP) .................................. 2012-192092
Jan. 22, 2013  (JP) .................................. 2013-009336

(51) Int. Cl.
*G09F 3/06*  (2006.01)
*G09F 3/00*  (2006.01)
(Continued)

(52) U.S. Cl.
CPC .............. *G09F 3/06* (2013.01); *B29C 65/002* (2013.01); *B29C 65/4895* (2013.01);
(Continued)

(58) Field of Classification Search
None
See application file for complete search history.

(56) References Cited

U.S. PATENT DOCUMENTS

| | | | |
|---|---|---|---|
| 7,108,906 B2 * | 9/2006 | Benim | B65D 23/0878 283/81 |
| 2006/0189030 A1 * | 8/2006 | Chambers | B65D 23/0878 438/106 |
| 2009/0041959 A1 * | 2/2009 | Dellevigne | B32B 5/022 428/34.2 |

FOREIGN PATENT DOCUMENTS

| | | |
|---|---|---|
| EP | 0 326 039 A1 | 8/1989 |
| EP | 1 724 740 A1 | 11/2006 |

(Continued)

OTHER PUBLICATIONS

JP 2005/289411 Machine Translation via AIPN website.*
(Continued)

*Primary Examiner* — Laura C Powers
(74) *Attorney, Agent, or Firm* — Frost Brown Todd LLC

(57) ABSTRACT

A cylindrical shrink label is provided with a heat-shrinkable label base material; and a joint formed by cylindrically forming the label base material so that the edges thereof overlap, and then solvent welding the inner surface of the outside edge, which is positioned on the outside of the cylinder, and the outer surface of the inside edge, which is positioned on the inside of the cylinder. A resin layer, which is soluble in a hot alkaline aqueous solution, is formed on the abovementioned inner surface and/or the abovementioned outer surface, which form the joint.

8 Claims, 7 Drawing Sheets

(51) Int. Cl.
- *G09F 3/02* (2006.01)
- *G09F 3/04* (2006.01)
- *B29C 65/76* (2006.01)
- *B29C 65/00* (2006.01)
- *B29C 65/50* (2006.01)
- *B29C 65/48* (2006.01)
- *B65D 23/08* (2006.01)
- *C08J 5/12* (2006.01)
- *B29L 23/00* (2006.01)
- *B29L 31/00* (2006.01)

(52) U.S. Cl.
CPC .......... *B29C 65/5057* (2013.01); *B29C 65/76* (2013.01); *B29C 66/1122* (2013.01); *B29C 66/133* (2013.01); *B29C 66/4322* (2013.01); *B29C 66/723* (2013.01); *B29C 66/73715* (2013.01); *B29C 66/73921* (2013.01); *B65D 23/0878* (2013.01); *C08J 5/122* (2013.01); *C08J 5/125* (2013.01); *G09F 3/0295* (2013.01); *B29C 66/5326* (2013.01); *B29C 66/71* (2013.01); *B29C 2795/00* (2013.01); *B29K 2995/0049* (2013.01); *B29L 2023/001* (2013.01); *B29L 2031/744* (2013.01); *G09F 3/04* (2013.01); *G09F 2003/0251* (2013.01); *G09F 2003/0273* (2013.01); *Y10T 428/1328* (2015.01)

(56) References Cited

FOREIGN PATENT DOCUMENTS

| | | |
|---|---|---|
| JP | H07-10376 Y2 | 3/1995 |
| JP | H10-123958 A | 5/1998 |
| JP | 2005-289411 A | 10/2005 |
| JP | 2005-350097 A | 12/2005 |
| JP | 2008-056247 A | 3/2008 |
| WO | 2015/026479 A1 | 2/2015 |

OTHER PUBLICATIONS

Nov. 19, 2013 International Search Report issued in International Application No. PCT/JP2013/073380.

Apr. 1, 2016 Extended Search Report issued in European Patent Application No. 13832237.5.

* cited by examiner

CYLINDRICAL SHRINK LABEL AND METHOD FOR PRODUCING SAME

TECHNICAL FIELD

The present invention relates to a cylindrical shrink label and a method for producing the same.

BACKGROUND ART

Containers such as PET bottles have shrink labels formed in cylindrical shapes attached thereon in order to display product names or the like and achieve decorative effects. Generally, such a cylindrical shrink label is formed by curling a label base material in a cylindrical shape and jointing overlapping opposite ends. Jointed ends are achieved by using, for example, solvent (solvent welding), adhesive, or the like.

It is necessary to peel a shrink label off a container to separate the label from the container in order to discard the labeled container to which the shrink label is attached. A common method for this separation is to form a tearing aid line such as a perforation with the label such that the label can be torn apart by using the aid (refer to, for example, Patent Document 1). There is also suggested another method, in which the jointed ends are formed with an adhesive which is soluble in an alkaline solution, whereby the jointed ends are peeled away from each other by immersing the labeled container into the alkaline solution (refer to, for example, Patent Document 2).

RELATED ART DOCUMENTS

Patent Documents

Patent Document 1: JP 2005-350097 A
Patent Document 2: JP H07-10376 Y

DISCLOSURE OF THE INVENTION

Problems to be Solved by the Invention

According to the methods disclosed in the above patent documents, the shrink label can be separated from the container by peeling the label off the container. However, in the former method, because consumers are forced to perform the separation process, the method must be improved in order to enhance usability for consumers. The latter method must be also improved in the light of productivity in that, because of the use of adhesive, the application speed is reduced as compared with the case of a solvent having a lower viscosity; and extra processes such as an adhesive drying process and aging processes are required.

Means for Solving the Problems

A cylindrical shrink label according to the present invention in one aspect is characterized by comprising a heat-shrinkable label base material, and jointed ends formed by arranging the label base material in a cylindrical shape, and overlapping and solvent welding opposite ends to each other. A resin layer soluble in a hot alkaline solution is formed at the jointed ends on at least one of the overlapped ends.

According to the above feature, because the resin layer formed at the jointed ends dissolves and the jointed ends are peeled away from each other by immersing the labeled container in a hot alkaline solution, the label can be easily peeled off the container. Further, according to the above feature, the cylindrical shrink label can be obtained in a highly productive process in which the cylindrical body is formed by solvent welding.

In a cylindrical shrink label according to the present invention, it is preferable that the resin layer comprises a base resin soluble in the solvent but insoluble in the hot alkaline solution, and a hot-alkaline-solution soluble resin soluble in the hot alkaline solution.

According to this feature, it becomes possible to easily maintain the adhesive strength of the jointed ends while in use, and also easily peel the jointed ends away from each other by using the hot alkaline solution.

A method of producing a cylindrical shrink label according to the present invention in one aspect is characterized by comprising a first process to provide a heat-shrinkable label base material, and a second process to form jointed ends by arranging the label base material in a cylindrical shape, overlapping opposite ends, and solvent welding an inner surface of an outer side end of the cylinder and an outer surface of an inner side end of the cylinder. In the first process, a resin layer soluble in a hot alkaline solution is formed on at least one of the inner surface and the outer surface.

In a method of producing the cylindrical shrink label according to the present invention, in the first process, the resin layer is formed on only one of the inner surface and the outer surface; and in the second process, the jointed ends are formed by applying the solvent on the other surface without the resin layer.

According to this feature, it becomes possible to easily maintain the adhesive strength of the jointed ends while in use, and also easily peel the jointed ends away from each other.

A cylindrical shrink label according to the present invention in one aspect is characterized by comprising a heat-shrinkable label base material, and jointed ends formed by arranging the label base material in a cylindrical shape, and overlapping and solvent welding opposite ends to each other. The jointed ends are formed with a sealing solvent containing a solvent component and a hot-alkaline-solution soluble resin soluble in a hot alkaline solution, and the hot-alkaline-solution soluble resin is sandwiched between the jointed ends.

According to the above feature, because the hot-alkaline-solution soluble resin sandwiched between the jointed ends dissolves and the jointed ends are peeled away from each other by immersing the labeled container in a hot alkaline solution, the label can be easily peeled off the container. Further, according to the above feature, the cylindrical shrink label can be obtained in a highly productive process in which the cylindrical body is formed by solvent welding.

In a cylindrical shrink label according to the present invention, it is preferable that a resin layer is provided at the jointed ends on at least one of the ends such that the resin layer is formed with a base resin soluble in the solvent component but insoluble in the hot alkaline solution. It is also preferable that the hot-alkaline-solution soluble resin is sandwiched between the jointed ends at which the resin layer and the label base material or the resin layers are solvent welded to each other. Further, it is preferable that the resin layer comprises the base resin layer and the hot-alkaline-solution soluble resin.

According to this feature, it becomes possible to easily maintain the adhesive strength of the jointed ends while in use, and also easily peel the jointed ends away from each other by using the hot alkaline solution.

A method of producing a cylindrical shrink label according to the present invention in one aspect is characterized by comprising a first process to provide a heat-shrinkable label base material, and a second process to form jointed ends by arranging the label base material in a cylindrical shape; and overlapping and solvent welding opposite ends with each other. The jointed ends are formed with a sealing solvent containing a solvent component and a hot-alkaline-solution soluble resin soluble in a hot alkaline solution, and in the second process, the jointed ends are formed by applying the sealing solvent on at least one of the ends.

In a method of producing the cylindrical shrink label according to the present invention, it is preferable that in the first process, a resin layer soluble in the solvent component but insoluble in the hot alkaline solution is formed only on one of the ends, and in the second process, the jointed ends are formed by applying the sealing solvent on the other end without the resin layer.

According to this feature, it becomes possible to easily maintain the adhesive strength of the jointed ends while in use, and also easily peel the jointed ends away from each other.

Effects of the Invention

According to the present invention, it becomes possible to provide a cylindrical shrink label with which a label can be easily peeled off a container without burdening consumers. Furthermore, according to the present invention, a cylindrical shrink label can be produced in a highly productive process.

BEST MODE FOR CARRYING OUT THE INVENTION

Figure 1:
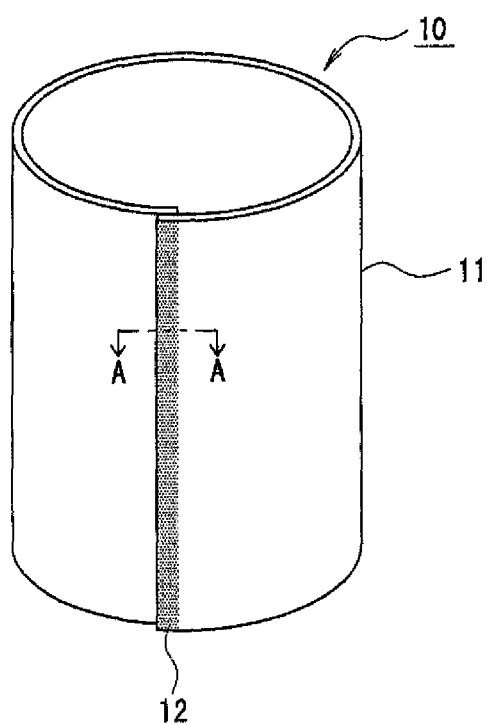
FIG. 1 shows a cylindrical shrink label of a first embodiment according to the present invention.
Figure 2A:
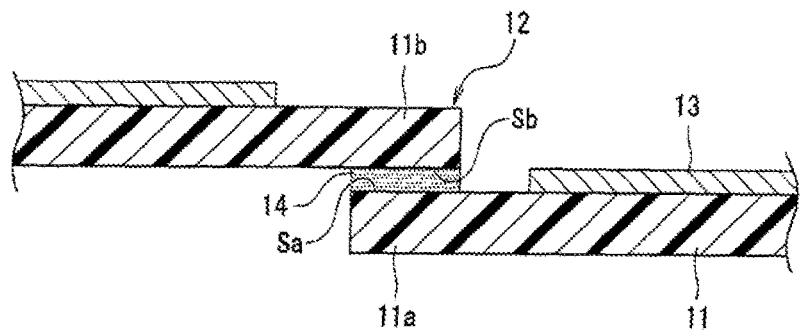
FIGS. 2(a)-2(d) show cross sectional views taken along line A-A in FIG. 1.
Figure 2B:
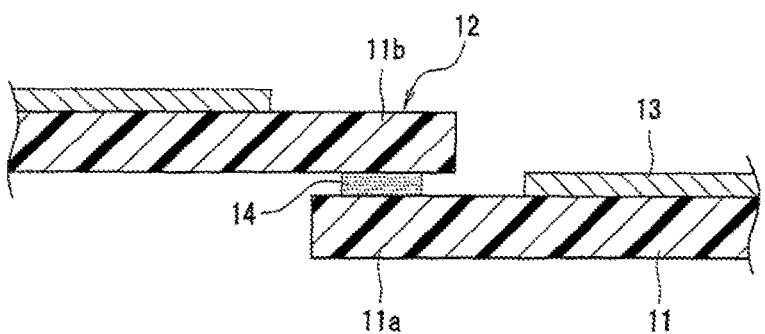
Figure 2C:
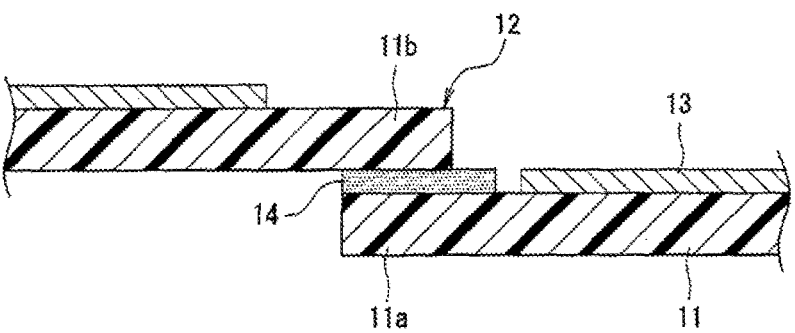
Figure 2D:
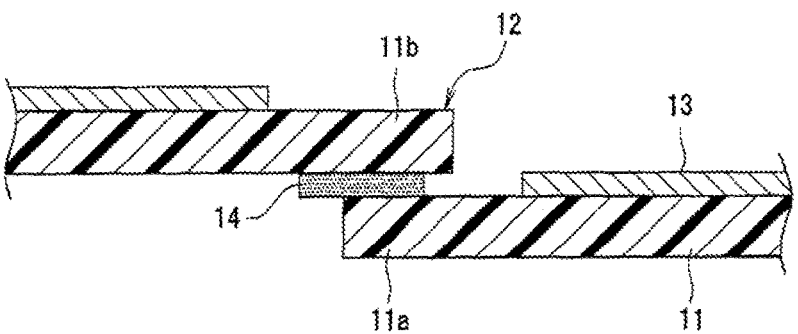

Although example embodiments of the present invention are described in detail below with reference to the drawings, the present invention is not limited to these examples. The drawings referred in the embodiments are drawn in a schematic manner. The size ratios or other details of the elements depicted in the drawings may be different from actual elements. Specific size ratio or other details should be determined by reference to the descriptions below.

First Embodiment

First, a structure of a cylindrical shrink label 10 of a first embodiment according to the present invention is described with reference to FIGS. 1 and 2(a)-2(d). FIG. 1 shows a cylindrical shrink label 10 which comprises a heat-shrinkable label base material 11 and jointed ends 12 which are formed by arranging the label base material 11 in a cylindrical shape; overlapping the opposite ends; and solvent welding these ends. A resin layer 14 which is soluble in a hot alkaline solution is formed on at least one of the overlapping ends. This embodiment is described by assuming that the jointed ends 12 are formed by solvent welding the inner surface of the outside end of the cylinder (hereinafter referred to as "outside end 11a") and the outer surface of the inside end of the cylinder (hereinafter referred to as "inside end 11b"). However, as described below, the joint pattern of the jointed ends 12 is not restricted to this embodiment. The outside end 11a and the inside end 11b are the overlapping opposite ends of the cylindrical label base material 11 such that the outside end 11a is located on the outer side of the inside end 11b in the cylindrical shape. FIGS. 2(a)-2(d) show cross-sectional views taken along line A-A in FIG. 1. Four different patterns are shown in FIGS. 2(a) to 2(d).

As shown in FIGS. 1 and 2(a)-2(d) the cylindrical shrink label 10 is formed from the cylindrically-shaped label base material 11 which is kept it the cylindrical shape with the jointed ends 12. The cylindrical shrink label 10 is, for example, wrapped around a container of any of various kinds, and then heated to be heat-shrunk to conform to the shape of the container and be attached thereon. The label base material 11 is heat shrinkable such that by applying a heating process, the label base material 11 shrinks with the heat, achieving a label attachment in which the label conforms to the shape of the container. The jointed ends 12 are formed by solvent welding the inner surface of the outside end 11a and the outer surface of the inside end 11b. The jointed ends 12 are not peeled away from each other during use of the labeled container, but are easily peelable by using a hot alkaline solution after the container has been discarded.

The label base material 11 is made from a shrinkable film. The label base material 11 is not restricted to a particular kind, and any conventional well-known resin film can be used, so long as the resin film is solvent weldable to form the jointed ends 12. As the resin film, a single kind or a mixture of two or more kinds of thermoplastic resins may be preferably selected from, for example, a polyester-based resin, a polystyrene-based resin, a polyvinyl chloride-based resin, a polyolefin-based resin, a polyamide resin, an aramid resin, a polyimide resin, a polyphenylene sulfide resin, and an acrylic-based resin. A resin film made from the polyester-based resin, the polystyrene-based resin, or the polyolefin-based resin is particularly preferable.

As a polyester-based resin, a polyethylene terephthalate (PET)-based resin, a poly(ethylene-2,6-naphthalene dicarboxylate) (PEN) resin, a polylactic acid (PLA) resin, or other resins may be used. The PET-based resin is most preferable among these resins. As the PET-based resin, the following resins can be used: polyethylene terephthalate (PET) containing terephthalic acid as a dicarboxylic acid component and ethylene glycol as a diol component; copolyester (CHDM copolymerized PET) containing terephthalic acid as a dicarboxylic acid component, ethylene glycol as the main component of a diol component, and 1,4-cyclohexanedimethanol (CHDM) as a copolymer component; copolyester (NPG copolymerized PET) containing terephthalic acid as a dicarboxylic acid component, ethylene glycol as the main component of a diol component, and neopentyl glycol (NPG) as a copolymer component; diol-modified PET such as a copolyester containing terephthalic acid as a dicarboxylic acid component, ethylene glycol as the main component of a diol component, and diol component excluding ethylene glycol such as diethylene glycol as a copolymer component; dicarboxylic acid-modified PET containing terephthalic acid as a dicarboxylic acid component, ethylene glycol as the main component of a diol component, and dicarboxylic acid component excluding terephthalic acid as a copolymer component (in a dicarboxylic acid component, the resin contains terephthalic acid as the main component and is modified with isophthalic acid and/or adipic acid). Alternatively, PET containing a modification component in both of the diol component and the dicarboxylic acid component may be used.

It is preferable to use, as a PET-based resin, a modified PET which contains terephthalic acid as the main component of dicarboxylic acid and ethylene glycol as the main component of diol component and a modification component in at least one of the diol component and the dicarboxylic acid.

As a polystyrene-based resin, a resin containing a single or two or more styrene-based monomers as a component monomer may be used; for example, styrene, α-methylstyrene, m-methylstyrene, p-methylstyrene, p-ethyl styrene, p-isobutylstyrene, p-t-butylstyrene, and chloromethylstyrene. Specifically, general purpose polystyrene, styrene-butadiene copolymer (SBS), styrene-butadiene-isoprene copolymer (SBIS), styrene-acrylic acid ester copolymer, and a high-impact polystyrene (HIPS) may be used. It is preferable to use SBS as the surface layers for a film made from a polystyrene-based resin.

As a polyolefin-based resin, the following resins can be used: a polyethylene-based resin such as low-density polyethylene (LDPE), linear low-density polyethylene (LLDPE), or metallocene catalyst-based LLDPE (mLLDPE); a polypropylene resin such as polypropylene or propylene-α-olefin copolymer; ethylene-vinyl acetate copolymer; and a cyclic olefin resin. It is preferable to use the cyclic olefin resin as the surface layers for a film made from a polyolefin resin.

The label base material 11 may have a single layer structure or a laminated structure (multi-layer structure). To form the base material 11 from laminated films, two or more films of the same resin or different resins can be laminated. It is preferable to use a polyester-based resin, a polystyrene-based resin, or a polyolefin-based resin such as a cyclic olefin resin at least for the surface layers of the label base material 11 made from the laminated films. It is more preferable to use modified PET, SBS, or a cyclic olefin resin. As examples of the label base material 11, a three-layered or five-layered laminated film may be formed such that a polyester-based resin (preferably, modified PET) is used for the surface layers and a polyolefin-based resin (for example, a polypropylene-based resin and a polyethylene-based resin) or a polystyrene-based resin (for example, SBS) is used for an intermediate layer. As another example, a three-layered or five-layered laminated film may be formed such that a polystyrene-based resin (preferably, SBS) is used for the surface layers and a polyolefin-based resin (for example, a polypropylene-based resin or a polyethylene-based resin) or a polyester-based resin (for example, modified PET) is used for an intermediate layer. A further example is three-layered or five-layered laminated film having a cyclic olefin resin for the surface layers and a polyethylene-based resin or a polypropylene-based resin for an intermediate layer. Furthermore, the laminated film may include five or more layers having, for example, a polyester-based resin (preferably, modified PET) for the surface layers and a polystyrene-based resin (preferably, SBS) for two or more intermediate layers which are laminated with other layers between them (for example, 2 to 35 layers). The laminated film may also include a cyclic olefin resin for the surface layers and a polypropylene-based resin or a polyethylene-based resin for two or more intermediate layers which are laminated with other layers between them (for example, 2 to 35 layers). It should be noted that a film containing a polyester-based resin in any one of the layers is preferable, because such a film is likely to have a large residual stress after the label is attached.

It is preferable that the relative density of the label base material 11 is less than one and the relative density of the cylindrical shrink label 10 is also less than one. More specifically, it is preferable that the relative density of the label base material 11 is less than 0.97, more preferably less than 0.95. As a specific example, the label base material 11 may contain a film made from a polyolefin-based resin (for example, a three-layered or five-layered laminated film containing a cyclic olefin resin for the surface layers and a polyethylene-based resin or polypropylene-based resin for an intermediate layer; or a laminated film containing a cyclic olefin resin for the surface layers and a polypropylene-based resin or a polyethylene-based resin for two or more intermediate layers which are laminated with other layers between them. (for example, 2 to 35 layers)) or a film containing bubbles (for example, a polyester-based film containing bubbles; a polystyrene-based film containing bubbles; or a laminated film containing a polyester-based resin for the surface layers and one or more intermediate layers containing bubbles therebetween). In this way, when the relative density of the container is one or more, it becomes easy to perform a relative density separation between the cylindrical shrink label 10 and the container, by immersing the labeled container in a hot alkaline solution. It should be noted that, in many cases, films containing bubbles are white.

The label base material 11 is mainly drawn in a single direction (uniaxial drawing) and is heat-shrinkable in the same direction (main drawing direction). The drawing ratio is preferably about two to six times in the single direction (main drawing direction). The label base material 11 is also drawn in the direction perpendicular to the main drawing direction at a drawing ratio of about 1.01 to 2 times (biaxial drawing) such that shrinking and expansion can be restricted in this direction. The heat shrinkage percentage of the label base material 11 (heating process conditions: immersed for ten seconds in hot water at 90° C.) in the main drawing direction is preferably 20 to 80%, more preferably 30 to 80%. The heat shrinkage percentage of the label base material 11 in the direction perpendicular to the main drawing direction is preferably at 15% or less, more preferably 10% or less, and most preferably 5% or less. The cylindrical shrink label 10 is formed such that the main drawing direction of the label base material 11 is the circumferential direction of the cylindrical shrink label 10.

Although the thickness of the label base material 11 is not limited to any particular range, the label base material 11 preferably has a thickness of 10 pin to 100 μm, more preferably 15 μm to 80 μm, and most preferably 20 μm to 60 μm. A conventional surface processing such as a corona discharge treatment or primer treatment may be applied as required to the surfaces of the label base material 11.

A design print layer 13 for displaying product names, illustrations, cautions in using the products, or the like can be displayed on the label base material 11. Although the design print layer 13 may be formed on the outer surface of the cylindrical shrink label 10, it is more preferable to form the design print layer 13 as an inner layer in order to prevent abrasions or the like, as shown FIGS. 2(*a*)-2(*d*). When the design print layer 13 is formed as an inner layer in the cylindrical shrink label 10 as shown in FIGS. 2*a*-2*d*, a transparent material is used as the label base material 11 such that the design on the design print layer 13 is visible through the transparent label base material. With a white film (such as a film turned white because of the bubbles contained therein) used as the label base material 11, the design print layer 13 is preferably formed on the outer side. It is also preferable that the design print layer 13 is formed in an area excluding the jointed ends 12 in consideration of adhesive properties or the like at the jointed ends 12. Although the thickness of the design print layer 13 is not limited to a particular range, it is preferable that the design print layer 13 has a thickness of 1μm to 10 μm.

A layer other than the design print layer 13 may also be provided on the label base material 11 unless the layer affects the shrink properties. For example, a protection layer may be provided on the design print layer. Further, a transparent overcoat layer may be disposed on the outer surface of the label base material 11 except for the jointed ends 12 in order to provide smoothness, prevent abrasions, or the like.

As described above, the jointed ends 12 are formed by solvent welding the inner surface of the outside end 11*a* and the outer surface of the inside end 11*b*. The outside end 11*a* is positioned at the outer side overlapping end of the cylinder when the label base material 11 is arranged in a cylindrical shape and the opposite ends of the label base material 11 are overlapped with each other, while the inside end 11*b* is positioned at the inner side overlapping end of the cylinder. In the descriptions below, the areas of the inner surface of the outside end 11*a* and the outer surface of the inside end 11*b* where the jointed ends 12 are formed by welding the ends to each other are respectively called "inner surface Sa" and "outer surface Sb." The jointed ends 12 are formed from the top edge to the bottom edge of the label; for example, 0.5 to 10 mm width in the circumferential direction of the cylinder, preferably about 1 to 5 mm width.

The jointed ends 12 include a resin layer 14 which is soluble in a hot alkaline solution. The resin layer 14 is formed on at least one of the inner surface of the outside end 11*a* and the outer surface of the inside end 11*b*. It is preferable that the resin layer 14 is formed in the entire area of the jointed ends 12 to be solvent welded, and in the entire area of the inner surface Sa and/or the outer surface Sb (meaning at least one of the inner surface Sa and the outer surface Sb, hereinafter meaning the same). In other words, it is preferable that the jointed ends 12 do not include any areas where the opposite ends of the label base material 11 are directly welded, so that the resin layer 14 is present everywhere between the inner surface Sa and the outer surface Sb.

In FIG. 2(*a*), the resin layer 14 is formed in the entire area of the outside end 11*a* and/or the inside end 11*b* such that the label base material 11 and the resin layer 14 are welded to form the jointed ends 12 in the entire or some portions of the area where the resin layer is formed. However, as shown in FIG. 2(*b*), the resin layer 14 may be formed partially on the outside end 11*a* and/or the inside end 11*b*. Also in the embodiment shown in FIG. 2(*b*), the entire or partial areas of the area where the resin layer is formed may form the jointed ends 12. It should be noted that because the ends of the label base material 11 should be prevented from being directly welded from each other, it is more preferable that the jointed ends 12 are formed on a partial area rather than on the entire area. Alternatively, as shown in FIGS. 2(*c*) and (*d*), the resin layer 14 may be formed in a wide area protruding from the outside end 11*a* and/or the inside end 11*b*. In the embodiment shown in FIG. 2(*c*), the resin layer 14 is formed on the inner surface of the outside end 11*a* of the label base material 11 such that the resin layer 14 extends in the circumferential direction beyond the overlapping area and the resin layer 14 has a width wider than the outside end 11*a*; and the inner surface of the resin layer 14 disposed on the outside end 11*a* and the outer surface of the label base material 11 at the inside end 11*b* is solvent welded. It is also preferable that as shown in FIG. 2(*d*), the resin layer 14 is formed on the outer surface of the inside end 11*b* of the label base material 11 to have a wide width such that the resin layer 14 extends in the circumferential direction protruding from the overlapping area, and the inner surface of the outside end 11*a* of the label base material 11 and the outer surface of the inside end 11*b* of the resin layer 14 are solvent welded. In the embodiment shown in FIG. 2(*d*), the resin layer 14 is formed excluding the area of a predetermined width from the edge of the inside end 11*b*. It is preferable, as in this embodiment, that no resin layer 14 is provided in an area of a predetermined width from the edge of the inside end 11*b*. It should be noted that, in the cylindrical shrink label 10, it may be impossible to determine whether the resin layer 14 has been formed on the outside end 11*a* or the inside end 11*b* before forming the jointed ends 12.

The resin layer 14 is made from a resin which is not tacky at room temperature, is solvent weldable with respect to the label base material 11 or the resin layer 14 itself, and is soluble in a hot alkaline solution. It is preferable that the resin layer 14 contains a hot-alkaline-solution soluble resin which is soluble in a hot alkaline solution. It is further preferable that, in addition to the hot-alkaline-solution soluble resin, the resin layer 14 contains a base resin which is soluble in a sealing solvent (such as THF) forming the jointed ends 12, but non-soluble in a hot alkaline solution. When the resin layer 14 contains the hot-alkaline-solution soluble resin, the jointed ends 12 accordingly include the hot-alkaline-solution soluble resin sandwiched therebetween.

Although the solvent (sealing solvent) forming the jointed ends 12 may vary depending on the types of the label base material 11 and the resin layer 14, and any well-known sealing solvents may be used, the following materials are preferable: tetrahydrofuran (THF), 1,3-dioxolan, dioxane, n-hexane, cyclohexane, methylcyclohexane, methyl ethyl ketone (MEK), acetone, methyl isobutyl ketone (MIBK), methyl acetate, methanol, and isopropyl alcohol. Among these materials, THF, MEK, and 1,3-dioxolan are particularly preferable. The hot alkaline solution is a solution of a temperature of 85° C., containing sodium hydroxide (NaOH) dissolved in an amount of 1.5% by weight. It is particularly preferable that the resin layer 14 is soluble in a hot alkaline solution of a temperature at 80° C., containing sodium hydroxide dissolved in an amount of 1.0% by weight. Although the resin forming the resin layer 14 may be soluble in a low temperature alkaline solution (for example, lower than 40° C.) or hot water (for example, temperature at 80° C. or higher, less than pH7) so long as the resin is soluble in a hot alkaline solution, it is preferable that the resin layer 14 is non-soluble in low temperature water (for example, lower than 40° C.), in order to prevent the jointed ends 12 from being separated in chemical solutions or the like used in a production process. It is particularly preferable that the resin layer 14 is selectively soluble in a hot alkaline solution.

More specifically, it is preferable that when a labeled container on which the cylindrical shrink label 10 with the jointed ends 12 formed thereon is attached by heat shrinking is immersed in the hot alkaline solution for 20 minutes, the resin layer 14 is dissolved and the jointed ends 12 are peeled away from each other to separate the label from the container, while when the container is immersed for 20 minutes in a solution of a temperature at 40° C., including NaOH dissolved therein in an amount of 1% by weight, the resin layer 14 is non-soluble and the jointed ends 12 are not peelable.

A preferable example of the resin to form the resin layer 14 is a resin having a high acid value within the extent that allows the jointed ends 12 to maintain the adhesiveness. The acid value (mg-KOH/g-resin) is preferably at least 10 for the entire resin forming the resin layer 14 in consideration of solubility in the hot alkaline solution, more preferably 20 or higher, and most preferably 25 or higher. The acid value is preferably 200 or less in consideration of adhesiveness of the jointed ends 12 during use, more preferably 150 or less, and most preferably 100 or less. The acid value can be calculated from a result obtained by dissolving the resin in a titration solvent (for example, a mixed solvent of xylene and dimethylformamide) and applying potentiometric titration by using a potassium hydroxide solution of a predetermined concentration (for example, a potassium hydroxide ethanol solution of 0.1 mol/L).

Further, it is preferable as described above that the resin forming the resin layer 14 includes a base resin which is soluble in a sealing solvent (such as THF) forming the jointed ends 12 but non-soluble in the hot alkaline solution, and also includes a hot-alkaline-solution soluble resin which is soluble in a hot alkaline solution. The base resin preferably shows adhesive properties when dissolved in the sealing solvent, such as an urethane-based resin, an acrylic-based resin, a polyamide-based resin, a vinyl chloride-vinyl acetate-based resin, a polyester-based resin, a cellulose-based resin, or a resin of the same type as the resin forming the label base material 11. The urethane-based resin, the acrylic-based resin, and the polyamide-based resin are particularly preferable. It should be noted that being non-soluble in the hot alkaline solution indicates that the resin is not dissolved after being immersed in the hot alkaline solution for 20 minutes. The hot-alkaline-solution soluble resin is preferably soluble in a sealing solvent and has an acid value of 80 to 500. For example, styrene-maleic acid copolymer or an acrylic-based resin containing a carboxyl group having an acid value of 80 to 500 may be used. It is preferable that the mixture ratio of the base resin and the hot-alkaline-solution soluble resin is determined such that the acid value of the resin layer 14 as a whole is within the above-mentioned range. Although a suitable mixture ratio between the base resin and the hot-alkaline-solution soluble resin depends on the acid value or other factors, it is preferable to determine the mixture ratio so that the resin forming the resin layer 14 has the above-mentioned acid value in total. Although a suitable ratio of the hot-alkaline-solution soluble resin also depends on the acid value or the other factors, the ratio of the hot-alkaline-solution soluble resin may be 5 to 40% by weight with respect to the total weight of the resin forming the resin layer 14. By using the base resin together with the hot-alkaline-solution soluble resin, it becomes easier to maintain the adhesive strength at the jointed ends 12 while in use, and to peel the jointed ends 12 from each other when the container has been discarded.

Although the thickness of the resin layer 14 is not limited to a particular range, a preferable thickness is 0.1 μm to 5 μm, more preferably 0.2 μm to 3 μm, and most preferably 0.4 μm to 1 μm. It should be noted that the resin layer 14 may be formed partially at the jointed ends 12 within the extent that the peelability of the jointed ends 12 is not reduced.

Figure 3:
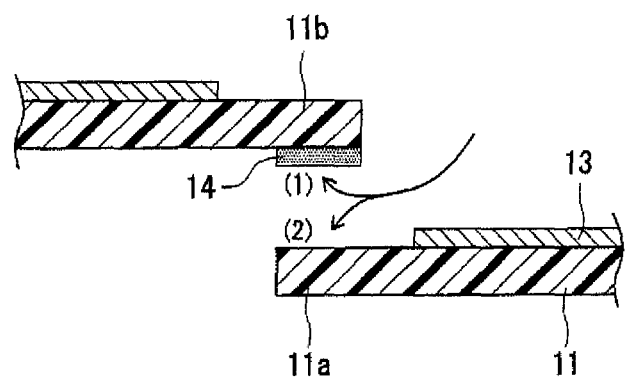
FIG. 3 shows a production process of the cylindrical shrink label of the first embodiment according to the present invention.
Figure 4:
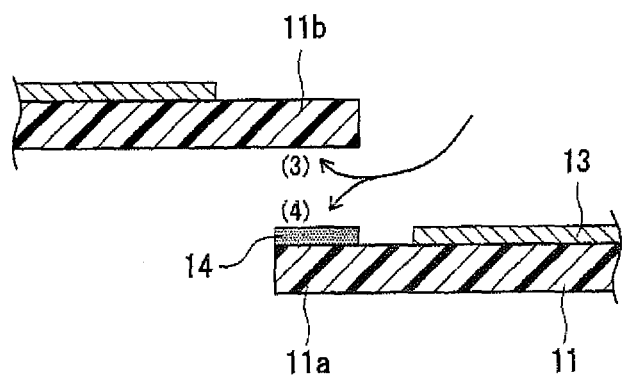
FIG. 4 shows a production process of the cylindrical shrink label of the first embodiment according to the present invention.
Figure 5:
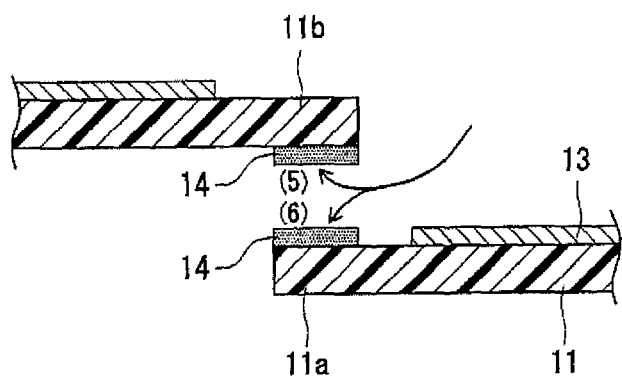
FIG. 5 shows a production process of the cylindrical shrink label of the first embodiment according to the present invention.

With reference to FIGS. 3 to 5, a production method of a cylindrical shrink label 10 having the above features is described below. In FIGS. 3 to 5, arrows (1) to (6) indicate the areas on which a sealing solvent is applied to form the jointed ends 12. It should be noted that, in the same drawings, the areas serving as the outside end 11a and the inside end 11b are shown with reference numerals 11a and 11b.

The cylindrical shrink label 10 is produced in a first process in which the label base material 11 is provided; and a second process in which the label base material 11 is curled in a cylindrical shape to overlap the opposite ends with each other, and the inner surface of the outside end 11a and the outer surface of the inside end 11b are solvent welded to form the jointed ends 12. This production process is characterized in that the resin layer 14 is formed on at least one of the inner surface of the outside end 11a and the outer surface of the inside end 11b in the first process.

In the first process, an elongated label base material 11 (hereinafter referred to as "elongated body 11") is prepared such that the elongated body 11 is drawn at a draw ratio of two to six times in the width direction (hereinafter referred to as "transverse direction (TD direction)") perpendicular to the longitudinal direction and heat shrinkable in the TD direction. The elongated body 11 may be drawn at a draw ratio of 1.01 to 2 times in the longitudinal direction (hereinafter referred to as "machine direction (MD direction)." The drawing process may be performed at a temperature of 70° C. to 100° C. by using a roll method, a tenter method, a tubular method, or other methods. In the elongated body 11, the TD direction is the main drawing direction; in other words, the main shrinkable direction. Next, the design print layer 13 is formed on one or both of the surfaces of the elongated body 11. It is preferable that after forming the design print layer 13, the elongated body 11 is cut in the MD direction to obtain the label base material 11 of a predetermined width.

The design print layer 13 is formed by applying print ink on one of the surfaces of the elongated body 11 and solidifying the print ink by drying or radiating UV light. In forming the design print layer 13, solution-type inks and UV-curable inks are used as the print ink. With such print inks, the design print layer 13 can be formed by performing gravure printing, flexographic printing, rotary letterpress printing, or the like. A protection layer or an overcoat layer may be formed as described above. These layers may be formed with well-known common inks (for example, inks not containing color materials) by gravure printing or the like.

In the first process, the resin layer 14 is formed on at least one of the inner surface of the outside end 11a of the elongated body 11 and the outer surface of the inside end 11b. The resin layer 14 may be formed by using a solution of the constituting resins as the ink in the same printing manner as with the design print layer 13. As the resins to form the resin layer 14, a resin containing the above base resin mixed with the above hot-alkaline-solution soluble resin in an amount of 5 to 40% by weight (with respect to the total weight of the resins in the resin layer 14) is preferable. The solvent to dissolve the constituting resins of the resin layer 14 is not limited to a particular kind, but methyl ethyl ketone (MEK) and ethyl acetate are commonly used.

The resin layer 14 is formed, for example, in the printing process before cutting, or in a period between after cutting and before forming the jointed ends. The outside end 11a and the inside end 11b are opposite ends of the elongated body 11 in the TD direction, having a shape of a strip in the MD direction with a width of about 1 mm to 20 mm. The resin layer 14 may be formed with a width of about 1 mm to 30 mm in the MD direction (longitudinal direction) at the outside end 11a and/or the inside end 11b. In order to avoid welding the ends of the label base material 11 directly to each other, it is preferable to form the resin layer 14 to be wider than the outside end 11a and the inside end 11b. When forming the resin layer 14 on both of the outside end 11a and the inside end 11b, the resin layer 14 is formed on one surface at one of the ends in the TD direction and on the other surface at the other end.

In the second process, the jointed ends 12 are formed by curling the elongated body 11, on which the design print layer 13 and the resin layer 14 are formed, into the cylindrical shape. Then, the cylindrical elongated body 11 is cut to form a cylindrical shrink label 10 such that the length in the MD direction becomes a desirable label length.

In the second process, the elongated body 11 is curled in a cylindrical shape to overlap the opposite ends along the MD direction of the elongated body 11 and solvent weld the ends. More specifically, as shown in FIGS. 3 to 5, a sealing solvent such as THF is applied on at least one of the ends (inner surface of the outside end 11a and/or the outer surface of the inside end 11b) of the elongated body 11 along the MD direction for a width of about 0.5 mm to 10 mm from the respective edges. It is preferable that the sealing solvent is applied to one of the ends of the elongated body 11 along the MD direction. Because the solvent such as THF has a lower viscosity than adhesives, the solvent can be continuously applied while feeding the elongated body 11 in the MD direction at high speed.

In the example shown in FIG. 3(1), the resin layer 14 is formed on the outer surface of the inside end 11b and the sealing solvent is applied on the resin layer 14. In the example shown in FIG. 3(2), the resin layer 14 is formed on the outer surface of the inside end 11b and the sealing solvent is applied on the inner surface of the outside end 11a without the resin layer 14.

In the example shown in FIG. 4(3), the resin layer 14 is formed on the inner surface of the outside end 11a and the sealing solvent is applied on the outer surface of the inside end 11b without the resin layer 14. In the example shown in FIG. 4(4), the resin layer 14 is formed on the inner surface of the outside end 11a and the sealing solvent is applied on the resin layer 14.

In the example shown in FIG. 5(5), the resin layers 14 are formed on the inner surface of the outside end 11a and the outer surface of the inside end 11b, and the sealing solvent is applied on the resin layer 14 formed on the inside end 11b. In the example shown in FIG. 5(6), the resin layers 14 are formed on the inner surface of the outside end 11a and the outer surface of the inside end 11b, and the sealing solvent is applied on the resin layer 14 formed on the outside end 11a.

When the resin layers 14 are formed on both of the outside end 11a and the inside end 11b as shown in FIG. 5, the sealing solvent may be applied on either one of the ends. However, when the resin layer 14 is formed on one of the outside end 11a and the inside end 11b, it is preferable that the sealing solvent is applied on the side without the resin layer 14. In particular, it is preferable that the sealing solvent is applied directly to the label base material 11. Therefore, the embodiment shown in FIG. 3(2) is more preferable than the embodiment shown in FIG. 3(1); similarly, the embodiment shown in FIG. 4(3) is more preferable than the embodiment shown in FIG. 4(4). In other words, it is preferable that the resin layer 14 is formed on the side with no sealing solvent directly applied thereon; and then the resin layer 14 is overlapped with the end where the solvent is directly applied. In this way, it becomes possible to reliably prevent the ends of the label base material 11 from being directly welded to each other, resulting in better peelability of the jointed ends 12. This is advantageous because the resin layer 14 is a thin layer, and if the solvent is directly applied for dissolution, there is a risk that the resin forming the resin layer 14 flows, causing some areas of the layer to become significantly thin or dissolved completely. Such a problem can be prevented by applying the solvent on the end without the resin layer 14 and then overlapping this end with the other end with the resin layer 14 formed thereon in order to avoid direct application of the solvent on the resin layer 14. This is preferable because it becomes possible to sufficiently dissolve the surface of the label base material 11 so that relatively constant strength of the jointed ends can be obtained by applying the solvent directly to the end without the resin layer 14.

Continuous jointed ends 12 are formed in the MD direction by applying the sealing solvent to one of the opposite ends along the MD direction of the elongated body 11, and overlapping this end with the other end on which the sealing solvent is applied thereon. The cylindrical elongated body 11 can be formed in this way. The cylindrical shrink label 10 can be obtained by cutting the label base material 11 along the TD direction to a respective label size.

Figure 6:
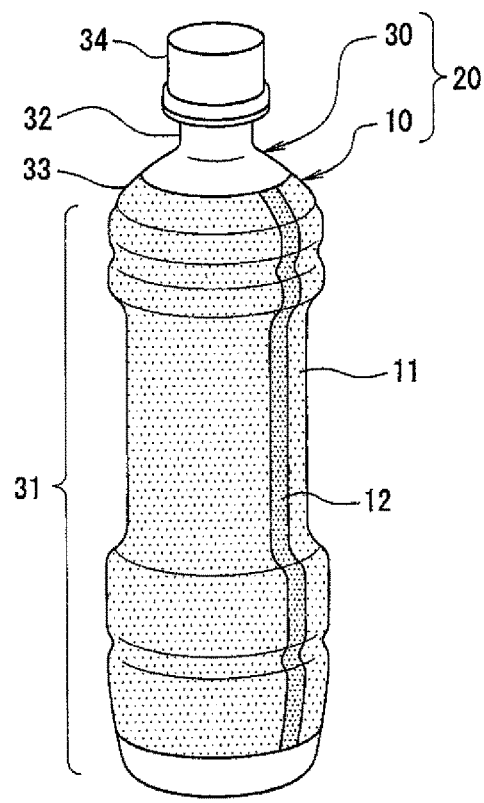
FIG. 6 shows a labeled container to which the cylindrical shrink label of the first embodiment according to the present invention is attached.

FIG. 6 shows a labeled container 20 which is one example of a labeled container with the cylindrical shrink label 10 applied thereon.

The labeled container 20 comprises a container 30 and the cylindrical shrink label 10 attached thereon. The cylindrical shrink label 10 is wrapped around the container 30, and then heated to be heat-shrunk to conform to the shape of the labeled container 20 to be attached thereon. The container 30 comprises a body portion 31 having a substantial cylindrical shape; a neck portion 32 having a diameter smaller than the body portion 31; a shoulder portion 33 which is located between the body portion 31 and the neck portion 32 and tapers towards the neck portion 32; and a cap portion 34 attached to the neck portion 32. The container 30 is, for example, a PET bottle to be filled with beverage. The cylindrical shrink label 10 is attached from the bottom of the body portion 31 to the intermediate portion of the shoulder portion 33.

It is preferable that the cylindrical shrink label 10 is attached to the container 30 such that the cylindrical shrink label 10 has a remaining force to be further heat-shrunk. Specifically, it is preferable that the cylindrical shrink label 10 is attached to the container 30 in such a manner that, when the cylindrical shrink label 10 is peeled off the labeled container 20 and heated (for example, to 80° C.), the cylindrical shrink label 10 is further heat-shrinkable with the remaining heat-shrinkable stress. It is preferable that the stress is 1 MPa or higher when the heat-shrinkable stress (80° C.) is measured at this occasion. In this way, when the labeled container 20 is processed in a hot alkaline solution as described below, the jointed ends 12 can be easily peeled away from each other because of the remaining heat-shrinkable stress acting on the jointed ends 12.

When discarding the labeled container 20, it is necessary to peel the cylindrical shrink label 10 off the container 30 so as to separate the label from the container. With the labeled container 20, the cylindrical shrink label 10 can be easily peeled off the container 30 by using the hot alkaline solution as a processing solution and immersing the labeled container 20 in the processing solution, or by spraying the processing solution to the labeled container 20. For example, the labeled container 20 is immersed for 20 minutes in a NaOH solution (1% by weight) at 80° C. In this way, the resin layer 14 of the jointed ends 12 are dissolved and the jointed ends 12 are peeled away from each other. Therefore, with the labeled container 20 using the cylindrical shrink label 10, it becomes possible to easily peel the labels off the containers without burdening consumers to peel off the labels. It should be noted that it is preferable that the resin layer 14 is not dissolved and thus the jointed ends 12 are not peelable when the labeled container is immersed for 20 minutes in an NaOH solution (1% by weight) at 40° C.

Second Embodiment

The structure of a cylindrical shrink label 50 of a second embodiment according to the present invention is described with reference to FIGS. 7 and 8(a)-8(d). In the descriptions below, the same reference numerals are assigned to the same or similar elements with those in the first embodiment and redundant descriptions are omitted.

Figure 7:
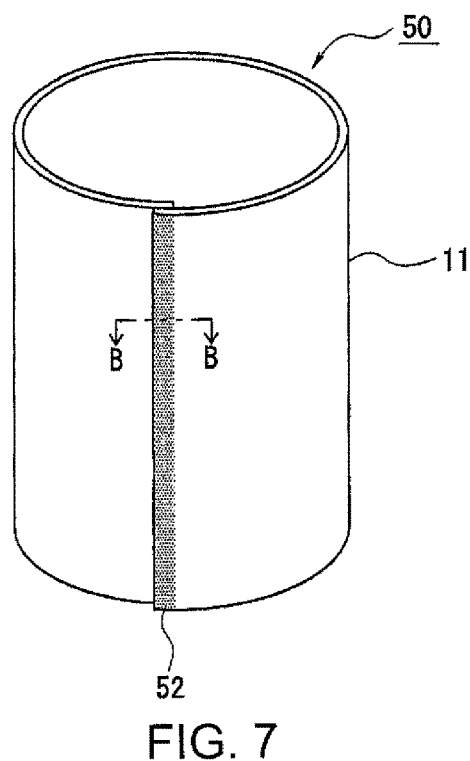
FIG. 7 shows a cylindrical shrink label of a second embodiment according to the present invention.

FIG. 7 shows the cylindrical shrink label 50 which comprises a heat-shrinkable label base material 11 and jointed ends 52 which is formed by arranging the label base material 11 in a cylindrical shape, and overlapping and solvent welding the opposite ends. The jointed ends 52 comprise a sealing solvent including a solvent component and a hot-alkaline-solution soluble resin 54 which is soluble in a solvent component. The jointed ends 52 also comprise hot-alkaline-solution soluble resin 54 sandwiched therebetween.

FIGS. 8(a)-8(d) show cross-sectional views taken along line B-B in FIG. 7. Four different patterns of the jointed ends 52 are shown in FIGS. 8(a) to (d). FIGS. 8(a)-8(d) show patterns of the jointed ends 52 in which one end is overlapped with the other end to form a cylindrical shape, and the inner surface of the one end at the out side end of cylinder (hereinafter referred to as "outside end 11a") and the outer surface of the other end art the inner side end of the cylinder (hereinafter referred to as "inside end 11b") are solvent welded. The outside end 11a and the inside end 11b indicate the portions where the opposite ends of the label base material 11 are overlapped with each other in a cylindrical shape. The patterns are described in detail below.

As show in FIGS. 7 and 8(a)-8(d) cylindrical shrink label 50 is a label in which the label base material 11 is formed in a cylindrical shape which is maintained with the jointed ends 52. The cylindrical shrink label 50 is, for example, wrapped around a container of any of various kinds, and heated to be heat-shrunk to conform to the shape of the container and be attached thereon. The label base material 11 is heat shrinkable such that by applying a heating process, the label base material 11 shrinks with the heat achieving a label attachment in which the label conforms to the shape of the container. The jointed ends 52 are formed by solvent welding the inner surface of the outside end 11a and the outer surface of the inside end 11b. The jointed ends 52 are not peelable during use the labeled container, but are easily peelable by using a hot alkaline solution when intentionally peeling the label off the container after the container is discarded or at other occasions.

Regarding the label base material 11, the same arrangements as in the first embodiment can be applied to the compositions, layer layout, heat shrinkage percentage, and a layer such as the design print layer 13 formed on the label base material 11.

As described above, the jointed ends 52 are formed by solvent welding the inner surface of the outside end 11a and the outer surface of the inside end 11b. The outside end 11a is positioned at the outer side overlapping end of the cylinder when the label base material 11 is arranged in a cylindrical shape and the opposite ends of the label base material 11 are overlapped with each other, while the inside end 11b is positioned at the inner side overlapping end of the cylinder. The areas of the inner surface of the outside end 11a and the outer surface of the inside end 11b where the jointed ends 52 are formed by welding the ends with each other are respectively called "inner surface Sa" and "outer surface Sb." The jointed ends 52 are formed from the top edge to the bottom edge of the label; for example, 0.5 to 10 mm in width in the circumferential direction of the cylinder, preferably 1 to 5 mm in width.

The jointed ends 52 include the hot-alkaline-solution soluble resin 54 sandwiched therebetween which is soluble in a hot alkaline solution. When the inner surface Sa and the outer surface Sb are dissolved with the solvent component in the sealing solvent and the resins of these surfaces are mixed to adhere to each other, the hot-alkaline-solution soluble resin 54 co-exists with the mixed resins. The hot-alkaline-solution soluble resin 54 is present, for example, as a thin layer in the entire region of the jointed ends 52. In the production process of the cylindrical shrink label 50, the hot-alkaline-solution soluble resin 54 is included in the sealing solvent used to form the jointed ends 52. By applying the sealing solvent to the area where the jointed ends 52 are formed (the inner surface Sa and/or the outer surface Sb; in the other words, at least one of the inner surface Sa and the outer surface Sb, hereinafter meaning the same), overlapping the opposite ends with each other, and drying the ends, the jointed ends 52 including the hot-alkaline-solution soluble resin 54 sandwiched therebetween are formed. It is preferable that the hot-alkaline-solution soluble resin 54 in an amount of 0.005 to 5 $g/m^2$ is provided in the jointed ends 52, more preferably 0.01 to 1 $g/m^2$, and most preferably 0.02 to 0.5 $g/m^2$.

The sealing solvent includes a solvent component which dissolves the label base material 11, and a hot-alkaline-solution soluble resin 54. It is preferable that the hot-alkaline-solution soluble resin 54 is soluble in the solvent component. Although the solvent component may be variable depending on the type of the label base material 11 and any well-known organic solvents may be used, the following materials are preferable: tetrahydrofuran (THF), 1,3-dioxolan, dioxane, n-hexane, cyclohexane, methylcyclohexane, methyl ethyl ketone (MEK), acetone, methyl isobutyl ketone (MIBK), methyl acetate, methanol, and isopropyl alcohol. Among these materials, THF, MEK, and 1,3-dioxolan are particularly preferable.

It is further preferable that a resin layer 55 formed from a base resin which is soluble in the solvent component of the sealing solvent but non-soluble in the hot alkaline solution is provided on the inner surface Sa of the outside end 11a and/or the outer surface Sb of the inside end 11b in the area corresponding to the jointed ends 52. The resin layer 55 is a coating layer formed on the label base material 11. The resin layer 55 serves to facilitate maintaining the adhesive strength at the jointed ends 12 while in use, and also peeling the jointed ends 52 in the hot alkaline solution. The resin layer 55 is formed on a partial area or the entire area of at least one of the inner surface Sa and the outer surface Sb. It is preferable that the resin layer 55 is formed on the entire area of at least one of the inner surface Sa and the outer surface Sb. In other words, it is preferable that the resin layer 55 is formed on at least one of the inner surface Sa and the outer surface Sb forming the jointed ends 52. When the resin layer 55 is formed on the inner surface Sa, the surface of the resin layer 55 serves as the inner surface Sa. When the resin layer 55 is formed on the outer surface Sb, the surface of the resin layer 55 serves as the outer surface Sb. It is preferable that the jointed ends 52 which are formed by solvent welding the surface of the resin layer 55 and the surface of the label base material 11 or the surfaces of resin layers 55 with each other include the hot-alkaline-solution soluble resin 54 sandwiched therebetween.

FIGS. 8(a)-8(d) show four patterns of the jointed ends 52.

Figure 8A:
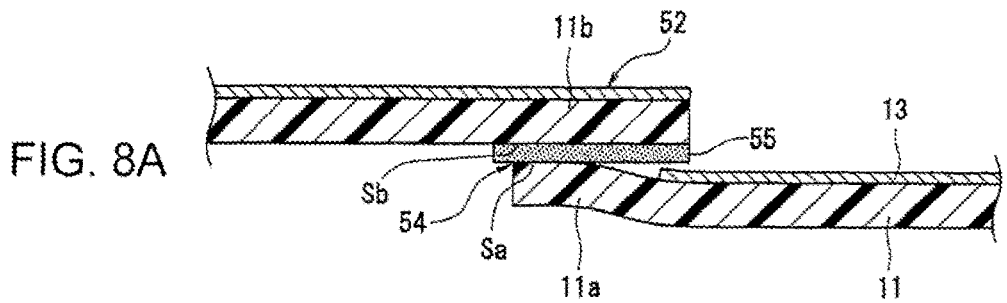
FIGS. 8(a)-8(d) show cross sectional views taken along line B-B in FIG. 7.

FIG. 8(a) shows the jointed ends 52 including the hot-alkaline-solution soluble resin 54 sandwiched therebetween. At the jointed ends 52, the resin layer 55 is formed on the entire area of the outer surface of the inside end 11b which is overlapped with the outside end 11a; and the label base material 11 at the outside end 11a and the resin layer 55 are solvent welded to each other in part of the area where the resin layer 55 is formed. The joint ends 52 are formed in an area of a predetermined width (for example, 1 to 5 mm) from the edge of the outside end 11a non-jointed areas are formed excluding the jointed ends 52 (from the edge of the jointed ends 52 to the edge of the inside end 11b). The resin layer 55 is formed to protrude from the inside end 11b such that the resin layer 55 has a width wider than the inside end 11b. It is preferable that the design print layer 13 is formed on both of the inner surfaces of the inside end 11b and the outside end 11a such that the part of the design print layer 13 in the outside end 11a and the design print layer 13 in the inside end 11b are overlapped when the opposite ends of the label base material 11 are overlapped with each other. An area with no design print layer 13 may be formed, depending on the design or the like.

Figure 8B:
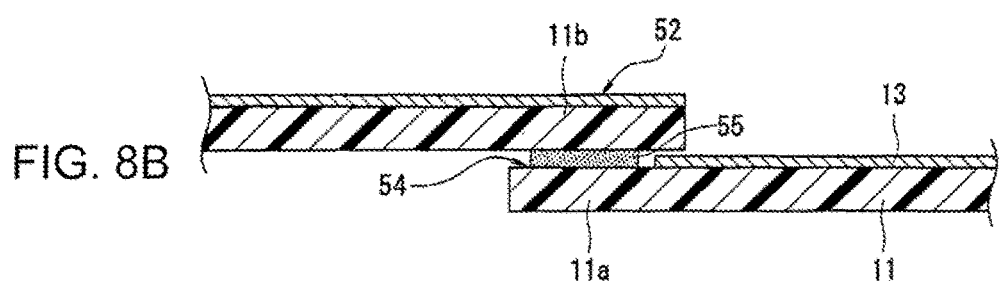

Although the resin layer 55 is formed on the entire outer surface of the inside end 11b in FIG. 8(a), the resin layer 55 may be formed in a partial area of the outer surface of the inside end 11b, as shown in FIG. 8(b). In the example shown in FIG. 8(b), the jointed ends 52 including the hot-alkaline-solution soluble resin 54 sandwiched therebetween are formed by solvent welding the resin layer 55 and the label base material 11 in the entire area where the resin layer 55 is formed. In FIG. 8(b), non-jointed areas are formed in the area of a predetermined width from the edge of the inside end 11b and in the area of a predetermined width from the edge of the outside end 11a. The jointed ends 52 are formed at the center of the overlapping area. In FIG. 8(b), the solvent welded jointed ends 52 may be formed in part of the area where the resin layer 55 is formed, similarly as in FIG. 8(a).

Figure 8C:
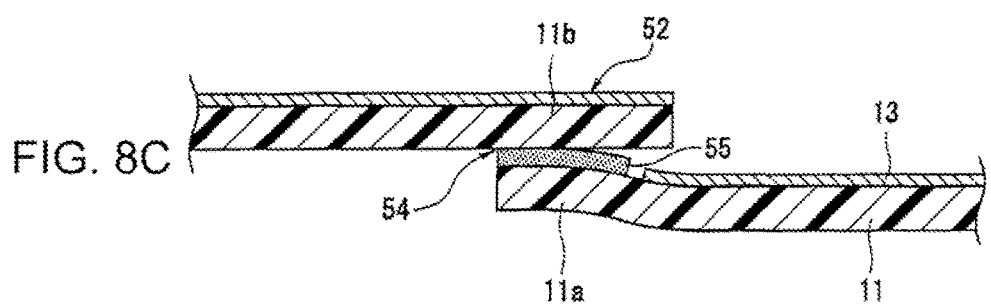

As shown in FIG. 8(c), the resin layer 55 may be formed on the inner surface of the outside end 11a. In the example shown in FIG. 8(c), the resin layer 55 which is narrower than the outside end 11a is formed on the inner surface of the outside end 11a of the label base material 11 in an area of a predetermined width (for example, 1 to 5 mm) from the edge of the outside end 11a. The inner surface of the resin layer 55 provided on the outside end 11a and the outer surface of the label base material 11 at the inside end 11b are solvent welded to form the jointed ends 52 including the hot-alkaline-solution soluble resin 54 sandwiched therebetween.

Figure 8D:
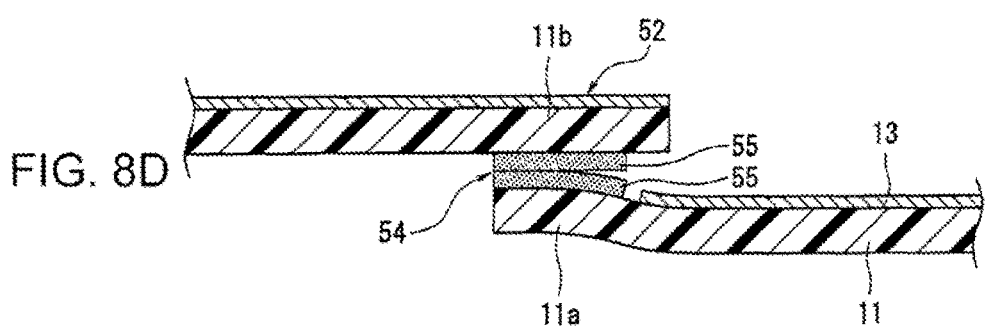

As shown in FIG. 8(d), the resin layers 55 may be formed on both of the outside end 11a and the inside end 11b. In the example shown in FIG. 8(d), the surface of the resin layer 55 provided on the outside end 11a and the surface of the other resin layer 55 provided on the inside end 11b are solvent welded to form the jointed ends 52 including the hot-alkaline-solution soluble resin 54 sandwiched therebetween. The resin layers 55 are formed except for the area of a predetermined width from the edge of the inside end 11b of the label base material 11. As in this example, an area without the resin layer 55 may be provided in an area of a predetermined width from the edge of the inside end 11b.

As described below, the hot-alkaline-solution soluble resin 54 is a resin which is soluble in a hot alkaline solution. The hot alkaline solution is a solution of a temperature of 85° C., containing sodium hydroxide (NaOH) dissolved in an amount of 1.5% by weight. The hot-alkaline-solution soluble resin 54 which is soluble in the hot alkaline solution of a temperature of 80° C., containing sodium hydroxide dissolved in an amount of 1.0% by weight, is particularly preferable. Although the hot-alkaline-solution soluble resin 54 may be soluble in a low temperature (for example, lower than 40° C.) alkaline solution (solution containing sodium hydroxide (NaOH) dissolved in an amount of 1.5% by weight) or hot water (for example, temperature of 80° C. or higher, less than pH7) so long as the hot-alkaline-solution soluble resin 54 is soluble in the hot alkaline solution, it is preferable that the hot-alkaline-solution soluble resin 54 is non-soluble in low temperature water (for example, lower than 40° C., less than pH7) such that the jointed ends 52 are not peelable in chemical solutions or the like used in production processes. It is particularly preferable that the hot-alkaline-solution soluble resin 54 is selectively soluble in the hot alkaline solution. It is also preferable that the hot-alkaline-solution soluble resin 54 is soluble in the solvent component of the sealing solvent.

It is preferable that the hot-alkaline-solution soluble resin 54 has a high acid value within the extent that allows the jointed ends 52 to maintain the adhesive properties. The acid value (mg-KOH/g-resin) is preferably at least 20 in consideration of solubility in the hot alkaline solution, more preferably 50 or higher, and most preferably over 80 or higher. The acid value is preferably 700 or less in consideration of adhesive property of the jointed ends 52 during use, more preferably 600 or less, and most preferably 500 or less. A preferable example of the hot-alkaline-solution soluble resin 54 is a resin having an acid value of 80 to 500. For example, a styrene-maleic acid copolymer and acrylic resin containing a carboxyl group having an acid value of 80 to 500 may be used. The acid value can be calculated from a result obtained by dissolving the resin in a titration solvent (for example, a mixed solvent of xylene and dimethylformamide) and applying potentiometric titration by using a potassium hydroxide solution of a predetermined concentration (for example, 0.1 mol/L potassium hydroxide ethanol solution).

As described above, the resin layer 55 serves to facilitate maintaining the adhesive strength at the jointed ends 52 during use, and also peeling the jointed ends 52 in the hot alkaline solution. The resin layer 55 is not tacky at room temperature and is solvent weldable with a resin forming the label base material 11 by using the above-described sealing solvent. It is also preferable that the resin layers 55 are solvent weldable with each other. It is further preferable that the resin layer 55 contains a base resin and serves as a coating layer. The resin layer 55 serving as the coating layer can be obtained by applying to the label base material 11 ink in which a base resin is dissolved or dispersed in a solvent, and drying and solidifying the ink.

The base resin forming the resin layer 55 is soluble in the solvent component of the sealing solvent but non-soluble in the hot alkaline solution. The base resin preferably exhibits adhesive properties when dissolved in the sealing solvent. A resin of the same type as the following resins may be used: for example, a urethane-based resin, an acrylic-based resin, a polyamide-based resin, a vinyl chloride-vinyl acetate-based resin, a polyester-based resin, a cellulose-based resin, and the resin forming the label base material 11. The urethane-based resin, the acrylic-based resin, and the polyamide-based resin are more preferable. It should be noted that being non-soluble in a hot alkaline solution indicates that the resin is not dissolved after being immersed in the hot alkaline solution for 20 minutes.

The resin layer 55 is preferably formed with the above-described base resin and the hot-alkaline-solution soluble resin. As the hot-alkaline-solution soluble resin to be included in the resin layer 55, the same resin as the hot-alkaline-solution soluble resin 54 included in the sealing solvent may be used. The mixture ratio between the base resin and the hot-alkaline-solution soluble resin in the resin layer 55 is preferably arranged to have an acid value of 10 or higher, more preferably 20 or higher, and most preferably 25 or higher, for the entire resin forming the resin layer 55. A suitable amount of the hot-alkaline-solution soluble resin with respect to the total weight of the resins (constituting resins) forming the resin layer 55 is, for example, 50% to 40% by weight, depending on the acid value or other factors. By using the base resin together with the hot-alkaline-solution soluble resin, it becomes easier to maintain the adhesive strength of the jointed ends 52 during use, and also to peel the jointed ends 52 from each other when intentionally separating the label from the container after the labeled container has been discarded or at other occasions.

Although the thickness of the resin layer 55 is not limited to any particular range, the resin layer 55 preferably has a thickness of 0.1 μm to 5 μm, more preferably 0.2 μm to 3 μm, and most preferably 0.4 μm to 1 μm. The resin layer 55 may be formed partially at the jointed ends 52 within the extent that the peelability of the jointed ends 52 is not reduced.

Figure 9:
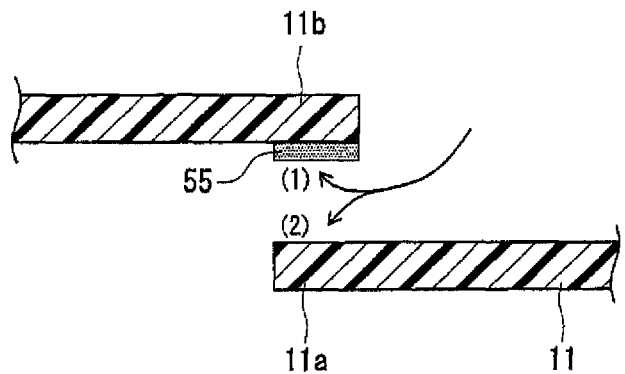
FIG. 9 shows a production process of the cylindrical shrink label of the second embodiment according to the present invention.
Figure 10:
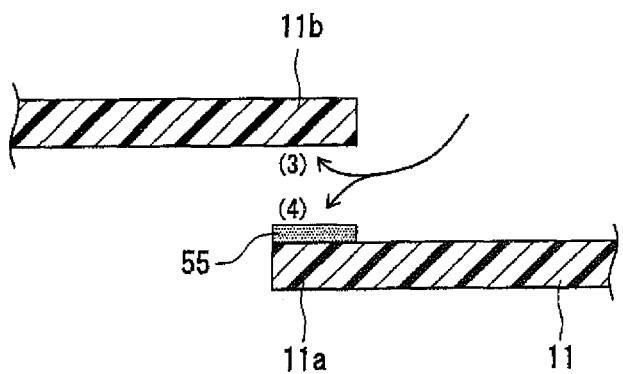
FIG. 10 shows a production process of the cylindrical shrink label of the second embodiment according to the present invention.
Figure 11:
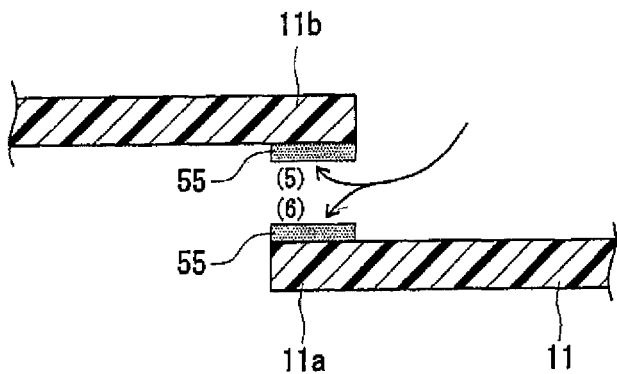
FIG. 11 shows a production process of the cylindrical shrink label of the second embodiment according to the present invention.

With reference to FIGS. 9 to 11, a preferable production method of a cylindrical shrink label 50 having the above features is described below. In FIGS. 9 to 11, arrows (1) to (6) show the areas on which a sealing solvent is applied when forming the jointed ends 52. It should be noted that the method shown in FIGS. 8a-8d is illustrated further schematically in FIG. 9, with the design print layer 13 omitted. The outside end 11a and the inside end 11b are shown with reference numerals 11a and 11b.

The cylindrical shrink label 50 is produced by a first process in which the label base material 11 is provided; and a second process in which the label base material 11 is curled in a cylindrical shape such that the opposite ends are overlapped with each other, and the overlapped ends (for example, the inner surface of the outside end 11a and the outer surface of the inside end 11b) are solvent welded to form the jointed ends 52. This production process is characterized in that, in the second process, by using a sealing solvent including the hot-alkaline-solution soluble resin 54 which is soluble in a hot alkaline solution, the jointed ends 52 are formed by applying the sealing solvent to at least one of the inner surface of the outside end 11a and the outside surface of the inside end 11b.

In the first process, an elongated label base material 11 (hereinafter referred to as "elongated body 11") is provided such that the elongated body 11 is heat shrinkable mainly in the width direction (hereinafter referred to as "transverse direction (TD direction)") perpendicular to the longitudinal direction (hereinafter referred to as "machine direction (MD direction)"). The elongated body 11 has a predetermined width in the TD direction, and a length in the MD direction 100 times or more the width in the TD direction. In order to obtain a predetermined heat shrinkage percentage, the elongated body 11 is drawn, for example, at a draw ratio of two to six times in the TD direction and at a draw ratio of 1.01 to 2 in the MD direction. The drawing process may be performed at a temperature of 70° C. to 100° C. by using a roll method, a tenter method, a tubular method, or the like. In the elongated body 11, the TD direction is the main drawing direction; in other words, the main shrinkable direction. When the design print layer 13 or another layer is required, the design print layer 13 or the like is provided in the next process on one or both of the surfaces of the elongated body 11. It is preferable that the first process includes a cutting process to cut the elongated body 11 to a predetermined width in the TD direction. The elongated body 11 of a predetermined width is obtained by cutting the elongated body 11 in the MD direction after forming the design print layer 13.

It is preferable that in the first process, the resin layer 55 is formed on at least one of the inner surface of the outside end 11a of the elongated body 11 and the outer surface of the inside end 11b. The resin layer 55 can be formed by using, as an ink, a solution obtained by dissolving or dispersing the constituting resins in the solvent and applying the ink in a well-known printing method such as gravure printing, flexographic printing, or rotary letterpress printing; and drying and solidifying the ink. In this way, the resin layer 55 serving as a coating layer can be obtained. The constituting resins mean the resins forming the resin layer 55. When the resin layer 55 includes the hot-alkaline-solution soluble resin, it is preferable to mix the base resin at 60% to 95% by weight and the hot-alkaline-solution soluble resin at 5% to 40% by weight, with respect to the total weight of the constituting resins. Although the solvent to dissolve the constituting resins is not limited to a particular kind, methyl ethyl ketone (MEK) and ethyl acetate are commonly used.

The resin layer 55 is formed, for example, after the printing process or cutting processes, and before forming the jointed ends. In particular, it is preferable to form the resin layer 55 after the printing process and before the cutting process. The first process preferably includes the printing process to provide the design print layer 13, the process to form the resin layer 55, and the cutting process, in this order. The outside end 11a and the inside end 11b are the respective ends in the TD direction, each having a shape of a strip along the MD direction with a width of about 1 mm to 20 mm. The resin layer 55 may be provided on the inner surface of the outside end 11*a* and/or the outer surface of the inside end 11*b* along the MD direction (longitudinal direction) for about 1 mm to 30 mm. It should be noted that because it is preferable that the resin layer 55 is formed in the entire area of the jointed ends, it is preferable that the resin layer 55 is formed wider than the outside end 11*a* and/or the inside end 11*b*. When the resin layer 55 is formed on both of the inner surface of the outside end 11*a* and the outer surface of the inside end 11*b*, the resin layer 55 is formed on one surface at one end and on the other surface on the other end in the TD direction.

In the second process, the cylindrically shaped elongated body 11 is prepared by arranging the elongated body 11 (preferably with the design print layer 13 and the resin layer 55 formed thereon) in a cylindrical shape and forming the jointed ends 52. Then, the cylindrically shaped label base material 11 is cut into an individual length in the MD direction to provide the cylindrical shrink label 50.

In the second process, the label base material 11 is arranged in a cylindrical shape and opposite ends (one end and the other end) along the MD direction of the elongated body 11 are overlapped and solvent welded. Specifically, as shown in FIGS. 9 to 11, first, a sealing solvent is applied to at least one of the ends (the inner surface of the outside end 11*a* and/or the outer surface of the inside end 11*b*) along the MD direction of the elongated body 11 for an area of about 0.5 mm to 10 mm width. Preferably, the sealing solvent is applied to one of the ends along the MD direction of the elongated body 11 (the area serving as the outside end 11*a* or the inside end 11*b*) for a predetermined width from the edge. Because the sealing solvent contains a larger amount of solvent component and has a lower viscosity than an adhesive, it becomes possible to continuously apply the sealing solvent while feeding the elongated body 11 in the MD direction at high speed.

As described above, the sealing solvent contains a solvent component such as THF, MEK, or 1,3-dioxolan, and the hot-alkaline-solution soluble resin 54 such as styrene-maleic acid copolymer or an acrylic-based resin containing a carboxyl group. The hot-alkaline-solution soluble resin 54 is preferably dissolved in the solvent component. The application amount of the sealing solvent is controlled such that the amount of the hot-alkaline-solution soluble resin 54 in the jointed ends 52 becomes suitable in consideration of the amount of the hot-alkaline-solution soluble resin 54 contained in the sealing solvent.

A preferable amount of the hot-alkaline-solution soluble resin 54 contained in the sealing solvent varies depending on whether or not the resin layer 55 is provided. With the resin layer 55 provided, the percentage of the amount of the hot-alkaline-solution soluble resin 54 is preferably 1 to 20% by weight with respect to the total weight of the sealing solvent, more preferably 3 to 15% by weight, and most preferably 5 to 10% by weight. Within such a range, it becomes easier to maintain the adhesive strength at the jointed ends 52 during use, and also to peel the jointed ends 52 when intentionally peeling the label off the container after the labeled container has been discarded. Without the resin layer 55, the percentage of the amount of the hot-alkaline-solution soluble resin 54 is preferably 5 to 30% by weight with respect to the total weight of the sealing solvent, more preferably 6 to 25% by weight, and most preferably 7 to 20% by weight. With the resin layer 55 provided, the percentage of the amount of the solvent component in the sealing solvent is preferably 80 to 99% by weight with respect to the total amount of the sealing solvent, more preferably 85 to 97% by weight, and most preferably 90 to 95% by weight. Without the resin layer 55, the percentage of the amount of solvent component in the sealing solvent is preferably 70 to 95% by weight with respect to the total amount of the sealing solvent, more preferably 75 to 94% by weight, and most preferably 80 to 93% by weight.

In the example, shown in FIG. 9(1), the resin layer 55 is formed on the outer surface of the inside end 11*b*, and the sealing solvent is applied on the resin layer 55. In the example shown in FIG. 9(2), the resin layer 55 is formed on the outer surface of the inside end 11*b*, and the sealing solvent is applied to the inner surface of the outside end 11*a* without the resin layer 55. The jointed ends 52 containing the hot-alkaline-solution soluble resin 54 sandwiched therebetween are provided by overlapping the inner surface of the outside end 11*a* (surface of the label base material 11) and the outer surface of the inside end 11*b* (surface of the resin layer 55) before the solvent component of the applied sealing solvent is volatized, and then volatizing and removing the solvent component.

In the example shown in FIG. 10(3), the resin layer 55 is formed on the inner surface of the outside end 11*a*, and the sealing solvent is applied to the outer surface of the inside end 11*b* without the resin layer 55. In the example shown in FIG. 10(4), the resin layer 55 is formed on the inner surface of the outside end 11*a*, and the sealing solvent is applied on the resin layer 55. The jointed ends 52 containing the hot-alkaline-solution soluble resin 54 sandwiched therebetween are provided by overlapping the outer surface of the inside end 11*b* (surface of the label base material 11) and the inner surface of the outside end 11*a* (surface of the resin layer 55) before the solvent component of the applied sealing solvent is volatized, and then volatizing and removing the solvent component.

In the example shown in FIG. 11(5), the resin layers 55 are formed on both of the inner surface of the outside end 11*a* and the outer surface of the inside end 11*b*, and the sealing solvent is applied on the resin layer 55 formed on the inside end 11*b*. In the example shown in FIG. 11(6), the resin layers 55 are formed on both of the inner surface of the outside end 11*a* and the outer surface of the inside end 11*b*, and the sealing solvent is applied on the resin layer 55 formed on the outside end 11*a*. The jointed ends 52 containing the hot-alkaline-solution soluble resin 54 sandwiched therebetween are provided by overlapping the outer surface of the inside end 11*b* (surface of the resin layer 55) and the inner surface of the outside end 11*a* (surface of the resin layer 55) before the solvent component of the applied sealing solvent is volatized, and then volatizing and removing the solvent component.

As shown in FIG. 11, when the resin layer 55 is formed on both of the outside end 11*a* and the inside end 11*b*, the sealing solvent may be applied to either one of the ends. In contrast, when the resin layer 55 is formed on one of the outside end 11*a* and the inside end 11*b* as shown in FIGS. 9 and 10, it is preferable that the sealing solvent is applied to the end without the resin layer 55. In particular, it is preferable that the sealing solvent is applied directly to the label base material 11. Therefore, the embodiment shown in FIG. 9(2) is more preferable than the embodiment shown in FIG. 9(1); and the embodiment shown in FIG. 10(3) is more preferable than the embodiment shown in FIG. 10(4). In other words, the resin layer 55 is formed on the side to which the solvent is not directly applied. In this way, the peelability of the jointed ends 52 can be enhanced because it is possible to reliably prevent the ends of the label base material 11 from being directly welded each other. This is because the resin on the surface of the label base material 11 can be considered to be more sufficiently dissolved by directly applying the sealing solvent on the surface of the label base material 11 than by applying the sealing solvent on the surface of the resin layer 55 and then overlapping this surface on the other surface of the label base material 11. As described above, it is preferable that the sealing solvent is directly applied to the surface without the resin layer 55 to solvent weld the surface, because it becomes possible to sufficiently dissolve the surface of the label base material 11 and obtain relatively constant strength of the jointed ends 52. It should be noted that the present invention is not limited to the above-mentioned case where the resin layer 55 is provided, but the ends (surfaces of the label base material 11) may be solvent welded to each other with the sealing solvent without providing the resin layer 55 on either end.

The jointed ends 52 which lie continuously in the MD direction are formed by applying the sealing solvent to one of the ends along the MD direction of the elongated body 11 and then overlapping the end with the solvent applied thereon on the other end. The cylindrical elongated body 11 can be obtained in this manner. The cylindrical shrink label 50 can be obtained by cutting the elongated body 11 along the TD direction to a respective label size.

Similarly as in the first embodiment, the cylindrical shrink label 50 can conform to the shape of the container 30 to be attached thereon to form the labeled container. With the labeled container having the cylindrical shrink label 50 attached thereon, the cylindrical shrink label 50 can be easily peeled off the container 30 by peeling the jointed ends 52 away from each other by using the alkaline solution as a processing solution and immersing the labeled container in the processing solution or spraying the processing solution to the labeled container. It should be noted that it is preferable that the hot-alkaline-solution soluble resin 54 does not dissolve and thus the jointed ends 52 are not peelable when the labeled container is immersed for 20 minutes in a NaOH solution (1% by weight) at 40° C.

Various varieties other than the above-mentioned varieties are also possible for the above embodiments. Although an embodiment example is described below as a variety of the second embodiment, this embodiment example may be applied to the first embodiment.

Figure 12:
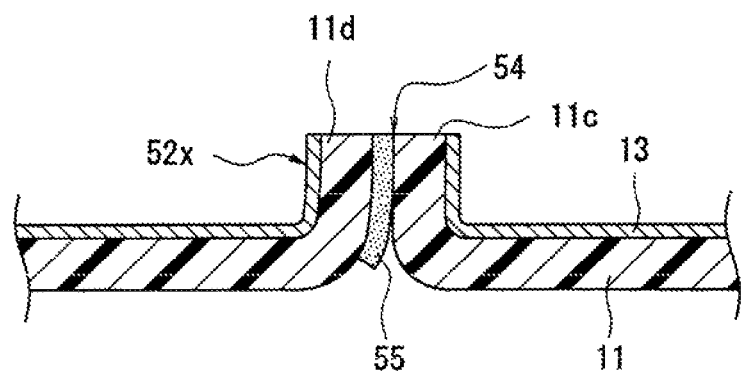
FIG. 12 shows a variation of the second embodiment.

For example, the jointed ends may be arranged as shown in an example in FIG. 12. In the example shown in FIG. 12, the outer surfaces of the one end 11c of the label base material 11 and the other end 11d are overlapped with each other and solvent welded to each other to form jointed ends 52x. The resin layer 55 is formed on the end 11c only. In the example shown in FIG. 12, the jointed ends 52x containing the hot-alkaline-solution soluble resin 54 sandwiched therebetween is provided by overlapping the outer surface of the one end 11c (surface of the resin layer 55) and the outer surface of the other end 11d (surface of the label base material 11) before the solvent component of the sealing solvent applied to the outer surface of the other surface 11d is volatized, and then volatizing and removing the solvent component. It should be noted that the jointed ends 52x may be formed by solvent welding the inner surfaces of the one end 11c and the other end 11d with each other. Further, the sealing solvent may be applied not to the other end 11d without the resin layer 55 but to the one end 11c with the resin layer 55 formed thereon. Furthermore, the jointed ends 52 may be formed by providing the resin layer 55 not only with the one end but also with the other end, or alternatively, by solvent welding the ends with the sealing solvent to each other without providing the resin layer 55 on either end.

Figure 13:
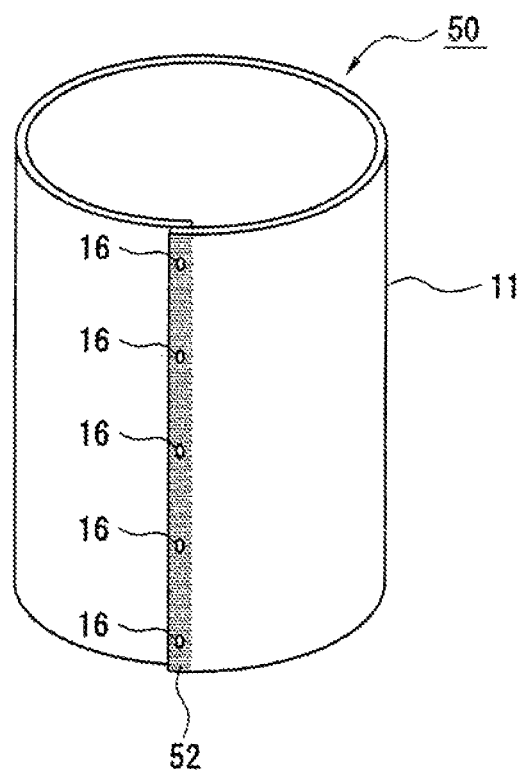
FIG. 13 shows a variation of the second embodiment.

In the example shown in FIG. 13, two or more through holes 16 (for example, five through holes aligning in the extending direction of the jointed ends) are formed at the jointed ends 52. The through holes 16 facilitate the penetration of the hot alkaline solution into the jointed ends 52 and serve to enhance the peelability of the jointed ends 52. The through holes 16 are not limited to any particular shapes or positions. For example, equally spaced oval through holes 16 elongated in the longitudinal direction of the jointed ends 52 may be formed. Furthermore, although the through holes 16 may be formed to penetrate through the outside end 11a only, it is preferable that the through holes 16 penetrate both of the outside end 11a and the inside end 11b. The through holes 16 may be formed by a well-known means including mechanical means such as a rotary blade or Thomson blade, and a thermal means such as a laser.

Although embodiments with the resin layer 55 provided with the jointed ends 52/52x are described in the above examples, the jointed ends 52 including the hot-alkaline-solution soluble resin 54 sandwiched therebetween may be formed, for example, by providing no resin layer 55, and solvent welding the surface of the outside end 11a of the label base material 11 and the surface of the inside end 11b of the label base material 11.

EXAMPLES

Although the prevent invention is further described below with specific examples, the present invention is not limited to these examples.

Example 1

A PET-based shrinkable film (LX-10S having a thickness of 40 µm, made by Mitsubishi Plastics, Inc.) heat shrinkable mainly in the TD direction of the elongated label base material was used as the label base material. A resin layer (thickness of 0.5 µm) soluble in a hot alkaline solution was formed on a surface (hereinafter called "first surface") of the one end (hereinafter called "first end") along the MD direction of the elongated label base material by gravure printing while feeding the label base material in the MD direction. The label base material was cut along the longitudinal direction to obtain an elongated label having a predetermined width such that the resin layer had a width of 10 mm from the edge of the first end. A design print layer was omitted.

The resin layer was formed by adding and dissolving 6 parts by weight of styrene maleic anhydride copolymer (SMA17352P made by Cray Valley Ltd.) into 100 parts by weight of YK mejiumu (gravure ink made by Dainichiseika Color & Chemicals Mfg. Co., Ltd.) as the ink containing the base resin.

The jointed ends were formed by applying THF on the other surface (hereinafter called "second surface") of the other end (hereinafter called "second end") along the MD direction of the elongated label base material of a predetermined width on which the resin layer is formed, and overlapping the THF applied end on the first surface of the first end to solvent weld the ends. The label base material was arranged in a cylindrical shape such that the TD direction was the circumferential direction, and the first end was positioned as the inside end, while the second end was positioned as the outside end (application pattern shown in FIG. 3(2)). The THF was applied on the second end for a predetermined width (3 mm) from the edge of the second end, and the overlapping width was about 6 mm. In this way, the cylindrical elongated label base material was obtained with the resin layer sandwiched between the first end and the second end at the jointed ends. A cylindrical shrink label was obtained by cutting this elongated cylindrical material to a predetermined label size.

A labeled container for evaluating alkaline peelability was provided by heat shrinking the cylindrical shrink label around a bottomed cylindrical glass container (225 ml mayonnaise bottle) so as to achieve about 5% shrinkage percentage at the body portion.

Regarding the cylindrical shrink label, the adhesiveness of the jointed ends and the peelability of the jointed ends in an alkaline solution are evaluated by using the measuring method described below. The results of the evaluation are shown in Tables 1 to 3.

<Adhesiveness Evaluation>

Evaluation under the conditions described below was performed by using the cylindrical shrink label in a T-type peeling test (complying with JIS K 6854-3). By drawing the jointed ends away from each other in the expandable direction to peel the jointed ends, the strength per unit width (converted to 1 cm) at which the jointed ends were peeled was measured to evaluate the adhesiveness of the jointed ends under the conditions described below.

Tables show the adhesiveness where

"Good" indicates that the jointed ends were peeled at a tensile strength of 2N/cm or higher;

"Fair" indicates that the jointed ends were peeled at a tensile strength from 1.5N/cm to less than 2N/cm; and "Insufficient" indicates that the jointed ends were peeled at a tensile strength less than 1.5N/cm.

<Evaluation of Peelability in Hot Alkaline Solution>

The peelability of the jointed ends was tested by using the above-described labeled container. The labeled container was immersed in a sodium hydroxide solution (85° C., 1.5% by weight) for 20 minutes.

Tables show peelability where

"Peeled" indicates that the jointed ends were peeled; and

"Not peeled" indicates that the jointed ends were not peeled.

Example 2

The cylindrical shrink label and the labeled container were provided in the same manner as in Example 1 except that the hot-alkaline-solution soluble resin was increased from 6 parts by weight to 9 parts by weight. The adhesiveness and the peelability in an alkaline solution were evaluated in the same manners as in Example 1.

Example 3

The cylindrical shrink label and the labeled container were provided in the same manner as in Example 1 except that the hot-alkaline-solution soluble resin was increased from 6 parts by weight to 12 parts by weight. The adhesiveness and the peelability in an alkaline solution were evaluated in the same manners as in Example 1.

Example 4

The cylindrical shrink label and the labeled container were provided in the same manner as in Example 1 except that the hot-alkaline-solution soluble resin was increased from 6 parts by weight to 15 parts by weight. The adhesiveness and the peelability in an alkaline solution were evaluated in the same manners as in Example 1.

Example 5

The cylindrical shrink label and the labeled container were provided in the same manner as in Example 1 except that 5 parts by weight of acrylic-based resin containing a carboxyl group (ARUFON UC3000 made by Toagosei Company, Ltd.) was used as the hot-alkaline-solution soluble resin. The adhesiveness and the peelability in an alkaline solution were evaluated in the same manners as in Example 1.

Example 6

The cylindrical shrink label and the labeled container were provided in the same manner as in Example 5 except that the hot-alkaline-solution soluble resin was increased from 5 parts by weight to 8 parts by weight. The adhesiveness and the peelability in an alkaline solution were evaluated in the same manners as in Example 5.

Example 7

The cylindrical shrink label and the label container were provided in the same manner as in Example 1 except that 5 parts by weight of acrylic-based resin containing a carboxyl group (JONCRYL683 made by BASF SE) was used as the hot-alkaline-solution soluble resin. The adhesiveness and the peelability in an alkaline solution were evaluated in the same manners as in Example 1.

Example 8

The cylindrical shrink label and the label container were provided in the same manner as Example 1 except that 5 parts by weight of acrylic-based resin containing a carboxyl group (JONCRYL678 made by BASF SE) was used as the hot-alkaline-solution soluble resin. The adhesiveness and the peelability in an alkaline solution were evaluated in the same manners as in Example 1.

TABLE 1

|  | Example 1 | Example 2 | Example 3 | Example 4 | Example 5 | Example 6 | Example 7 | Example 8 |
| --- | --- | --- | --- | --- | --- | --- | --- | --- |
| Base resin | 100 | 100 | 100 | 100 | 100 | 100 | 100 | 100 |
| Hot-alkaline-solution soluble resin E | 6 | 9 | 12 | 15 |  |  |  |  |
| Hot-alkaline-solution soluble resin F |  |  |  |  | 5 | 8 |  |  |
| Hot-alkaline-solution soluble resin G |  |  |  |  |  |  | 5 |  |
| Hot-alkaline-solution soluble resin H |  |  |  |  |  |  |  | 5 |

TABLE 1-continued

|  | Example 1 | Example 2 | Example 3 | Example 4 | Example 5 | Example 6 | Example 7 | Example 8 |
|---|---|---|---|---|---|---|---|---|
| Solvent application method | (2) | (2) | (2) | (2) | (2) | (2) | (2) | (2) |
| Adhesiveness evaluation | Good | Good | Good | Fair | Good | Good | Good | Good |
| Peelability in an alkaline solution evaluation | Peeled | Peeled | Peeled | Peeled | Peeled | Peeled | Peeled | Peeled |

Note:
The numerals in the base resin row and the hot-alkaline-solution soluble resin rows indicate parts by weight.
The numerals in the solvent application method row are the numbers selected from (1) to (6) in FIGS. 3 to 5.

As shown in Table 1, the adhesiveness of the jointed ends and the peelability of the jointed ends in an alkaline solution were either fair or good in any of the examples. Therefore, with the labeled container with the cylindrical shrink label of these examples, the label would not come off during transportation or while in use, and it would be possible to easily peel the label off the container by peeling the jointed ends away from each other by processing the container in the hot alkaline solution after the labeled container have been discarded.

Example 9

By using, as the label base material, an elongated PET type shrink film (LX-10S having a thickness of 40 µm, made by Mitsubishi Plastics, Inc.) which was heat shrinkable mainly in the TD direction, the resin layer (thickness: 0.5 µm) was formed on one surface (hereinafter called "first surface") of one end (hereinafter called "first end") along the MD direction of the elongated label base material by gravure printing while feeding the film in the MD direction. An elongated label base material of a predetermined width was provided by cutting the label base material in the longitudinal direction such that the resin layer was positioned to have a width of 10 mm from the edge of the first end. The design print layer was omitted.

The resin layer was formed by using YK mejiumu (gravure ink made by Dainichiseika Color & Chemicals Mfg. Co., Ltd.) as the ink containing the base resin.

The jointed ends were formed by applying the sealing solvent on the other surface (second surface) of the other end (second end) along the MD direction of the elongated label base material of a predetermined width on which the resin layer was formed, overlapping this sealing-solvent-applied end on the first surface of the first end, and solvent welding the ends. The jointed ends were formed by arranging the label base material in a cylindrical shape such that the second surface was the inner surface; the TD direction was the circumferential direction; the first end was the inside end; and the second end was the outside end (application pattern shown in FIG. 9(2)). The sealing solvent was applied to a predetermined width area (3 mm) from the edge of the second end, and the overlapping width was about 6 mm. In this way, a cylindrical elongated label base material containing the hot-alkaline-solution soluble resin sandwiched therebetween was provided such that the surface of the resin layer at the first end and the surface of the label base material at the second end were solvent welded to each other. By controlling the application amount of the sealing solvent, the amount of the hot-alkaline-solution soluble resin at the jointed ends was arranged to be 0.17 g/m². A cylindrical shrink label was provided by cutting this elongated cylindrical material to a predetermined label size.

As the sealing solvent, there was used a solvent containing 100 parts by weight of 1,3-dioxolan as the solvent component in which 9 parts by weight (8.3% by weight) of styrene maleic anhydride copolymer (SMA17352P made by Cray Valley Ltd., hereinafter referred to as "hot-alkaline-solution soluble resin A") was dissolved as the hot-alkaline-solution soluble resin.

A labeled container for evaluating the peelability in an alkaline solution was obtained by heat shrinking the cylindrical shrink label around a bottomed cylindrical glass container (225 ml mayonnaise bottle) so as to achieve a shrinkage percentage of about 5% at the body portion.

Regarding the above-described cylindrical shrink label, the adhesiveness of the jointed ends and the peelability of the jointed ends in an alkaline solution were evaluated using the above measurement method. The results of the evaluation are shown in Table 2.

Example 10

The cylindrical shrink label and the labeled container were provided in the same manner as Example 9 except that SMA1000P (styrene maleic anhydride copolymer made by Cray Valley Ltd., hereinafter referred to as "hot-alkaline-solution soluble resin B") was used in place of the hot-alkaline-solution soluble resin A (SMA17352P). The adhesiveness and the peelability in an alkaline solution were evaluated in the same manners as in Example 9.

Example 11

The cylindrical shrink label and the labeled container were provided in the same manner as Example 9 except that SMA2000P (styrene maleic anhydride copolymer made by Cray Valley Ltd., hereinafter referred to as "hot-alkaline-solution soluble resin C") was used in place of the hot-alkaline-solution soluble resin A (SMA17352P). The adhesiveness and the peelability in an alkaline solution were evaluated in the same manners as in Example 9.

Example 12

The cylindrical shrink label and the labeled container were provided in the same manner as Example 9 except that acrylic-based resin containing a carboxyl group (UC3000 made by Toagosei Company, Ltd., hereinafter referred to as "hot-alkaline-solution soluble resin D") was used in place of the hot-alkaline-solution soluble resin A (SMA17352P). The adhesiveness and the peelability in an alkaline solution were evaluated in the same manners as in Example 9.

Example 13

The cylindrical shrink label and the labeled container were provided in the same manner as Example 9 except that the resin layer was formed by using ink containing 100 parts by weight of YK mejiumu in which 5 parts by weight of the hot-alkaline-solution soluble resin A (SMA17352P) is dissolved. The adhesiveness and the peelability in an alkaline solution were evaluated in the same manners as in Example 9.

Example 14

The cylindrical shrink label and the labeled container were provided in the same manner as in Example 9 except that the resin layer was not formed. The adhesiveness and the peelability in an alkaline solution were evaluated in the same manners as in Example 9.

Example 15

The cylindrical shrink label and the labeled container were provided in the same manner as in Example 9 except that the resin layer was formed by using ink containing 100 parts by weight of YK mejiumu in which 10 parts by weight of the hot-alkaline-solution soluble resin A (SMA17352P) is dissolved and sealing solvent containing 100 parts by weight of 1,3-dioxolan in which 5 parts by weight of the hot-alkaline-solution soluble resin A (SMA17352P) is dissolved. The amount of the hot-alkaline-solution soluble resin sandwiched between the jointed ends was arranged to be 0.095 g/m². The adhesiveness and the peelability in an alkaline solution were evaluated in the same manners as in Example 9.

Example 16

The cylindrical shrink label and the labeled container were provided in the same manner as in Example 14 except that a sealing solvent containing 100 parts by weight of 1,3-dioxolan in which 15 parts by weight (13.0% by weight) of the hot-alkaline-solution soluble resin A is dissolved. The amount of the hot-alkaline-solution soluble resin sandwiched between the jointed ends was arranged to be 0.26 g/m². The adhesiveness and the peelability in an alkaline solution were evaluated in the same manners as in Example 14.

Comparative Example 1

The cylindrical shrink label and the labeled container were provided in the same manner as in Example 9 except that the jointed ends were formed by using a solvent component (1,3-dioxolan) containing no hot alkaline resin. The adhesiveness and the peelability in an alkaline solution were evaluated in the same manners as in Example 9.

TABLE 2

|  |  | Example 9 | Example 10 | Example 11 | Example 12 | Example 13 |
|---|---|---|---|---|---|---|
| Resin layer | Base resin | 100 | 100 | 100 | 100 | 100 |
|  | Hot-alkaline-solution soluble resin A |  |  |  |  | 5 |
| Sealing solvent | 1,3-dioxolan | 100 | 100 | 100 | 100 | 100 |
|  | Hot-alkaline-solution soluble resin A | 9 |  |  |  | 9 |
|  | Hot-alkaline-solution soluble resin B |  | 9 |  |  |  |
|  | Hot-alkaline-solution soluble resin C |  |  | 9 |  |  |
|  | Hot-alkaline-solution soluble resin D |  |  |  | 9 |  |
| Solvent application method |  | (2) | (2) | (2) | (2) | (2) |
| Adhesiveness evaluation |  | Good | Good | Good | Good | Good |
| Peelability in an alkaline solution evaluation |  | Peeled | Peeled | Peeled | Peeled | Peeled |

Note:
The numerals in the resin layer rows and the sealing solvent rows indicate parts by weight.
The numerals in the solvent application method are the numbers selected from (1) to (6) in FIGS. 9 to 11.

TABLE 3

|  |  | Example 14 | Example 15 | Example 16 | Comparative example 1 |
|---|---|---|---|---|---|
| Resin layer | Base resin |  | 100 |  | 100 |
|  | Hot-alkaline-solution soluble resin A |  | 10 |  |  |
| Sealing solvent | 1,3-dioxolan | 100 | 100 | 100 | 100 |
|  | Hot-alkaline-solution soluble resin A |  | 5 | 15 |  |
|  | Hot-alkaline-solution soluble resin B | 9 |  |  |  |
|  | Hot-alkaline-solution soluble resin C |  |  |  |  |
|  | Hot-alkaline-solution soluble resin D |  |  |  |  |
| Solvent application method |  | (2) | (2) | (2) | (2) |
| Adhesiveness evaluation |  | Good | Good | Good | Good |
| Peelability in an alkaline solution evaluation |  | Peeled | Peeled | Peeled | Not peeled |

As shown in Tables 2 and 3, the adhesiveness of the jointed ends and the peelability of the jointed ends in a hot alkaline solution were good in any of the examples. Therefore, for the labeled container with the cylindrical shrink label of these examples, the label would not come off during transportation or during use, and it would be possible to easily peel the jointed ends away from each other by processing the labeled container in the hot alkaline solution in order to intentionally peel the label off the container after the container has been discarded. However, the peelability of the jointed ends in a hot alkaline solution was insufficient in the comparative example.

REFERENCE NUMERALS

First Embodiment

10 cylindrical shrink label, 11 label base material, 11a outside end, 11b inside end, 12 jointed ends, 13 design print layer, 14 resin layer, 20 labeled container, 30 container, 31 body portion, 32 neck portion, 33 shoulder portion, and 34 cap portion.

Second Embodiment

50 cylindrical shrink label, 52 jointed ends, 54 hot-alkaline-solution soluble resin, and 55 resin layer.

The invention claimed is:

1. A cylindrical shrink label formed by:
overlapping two opposite ends of a heat-shrinkable label base material; and
solvent welding the two opposite ends to each other in order to arrange the label base material in a cylindrical shape, the solvent welding comprising applying a sealing solvent including (i) a solvent component and (ii) a first hot-alkaline-solution soluble resin soluble in a hot alkaline solution, the first hot-alkaline-solution soluble resin being sandwiched between the two opposite ends.

2. The cylindrical shrink label according to claim 1, wherein the solvent welding further comprises providing at least one resin layer on at least one of the two opposite ends, the resin layer being formed with (i) a base resin soluble in the solvent component but insoluble in the hot alkaline solution, and (ii) a second hot-alkaline-solution soluble resin soluble in the hot alkaline solution, and
a resin of the label base material, the base resin of the resin layer and the first and second hot-alkaline-solution soluble resins are dissolved and mixed in the sealing solvent.

3. The cylindrical shrink label according to claim 1, wherein an inside surface of one opposite end overlaps an outside surface of the other opposite end.

4. The cylindrical shrink label according to claim 2, wherein a width of the resin layer in a circumferential direction of the label base material is greater than a width of a portion of the label base material where the two opposite ends overlap.

5. The cylindrical shrink label according to claim 2, wherein the resin layer is provided on each of the two opposite ends.

6. The cylindrical shrink label according to claim 2, wherein the resin layer is provided on only one of the two opposite ends and the sealing solvent is applied only to the end opposite of the end that the resin layer is provided on.

7. The cylindrical shrink label according to claim 2, wherein a length of the resin layer extends from a top edge to a bottom edge of the label base material in a longitudinal direction.

8. The cylindrical shrink label according to claim 2, wherein an inside surface of one opposite end overlaps an outside surface of the other opposite end.

* * * * *